(12) United States Patent
Han et al.

(10) Patent No.: US 10,686,347 B2
(45) Date of Patent: Jun. 16, 2020

(54) HIGH-SPEED MOTOR

(71) Applicants: Seungjoo Han, Busan (KR); Byungho Han, Busan (KR); Jongtaek Han, Busan (KR)

(72) Inventors: Seungjoo Han, Busan (KR); Byungho Han, Busan (KR); Jongtaek Han, Busan (KR)

(*) Notice: Subject to any disclaimer, the term of this patent is extended or adjusted under 35 U.S.C. 154(b) by 94 days.

(21) Appl. No.: 15/779,844

(22) PCT Filed: Nov. 28, 2016

(86) PCT No.: PCT/KR2016/013751
§ 371 (c)(1),
(2) Date: May 29, 2018

(87) PCT Pub. No.: WO2017/099399
PCT Pub. Date: Jun. 15, 2017

(65) Prior Publication Data
US 2018/0367010 A1 Dec. 20, 2018

(30) Foreign Application Priority Data
Dec. 6, 2015 (KR) .................. 10-2015-0172841

(51) Int. Cl.
*H02K 7/09* (2006.01)
*H02K 1/27* (2006.01)
*H02K 1/28* (2006.01)
*H02K 7/116* (2006.01)
*H02K 7/11* (2006.01)
(Continued)

(52) U.S. Cl.
CPC .................. *H02K 7/09* (2013.01); *H02K 1/27* (2013.01); *H02K 1/278* (2013.01); *H02K 1/28* (2013.01);
(Continued)

(58) Field of Classification Search
CPC ............ H02K 1/278; H02K 1/27; H02K 1/28; H02K 7/09; H02K 7/116; H02K 99/00;
(Continued)

(56) References Cited

U.S. PATENT DOCUMENTS

| 5,436,518 A * | 7/1995 | Kawai ................. H02K 21/20 |
| | | 310/156.18 |
| 7,911,107 B2 * | 3/2011 | Nashiki ................. H02K 1/06 |
| | | 310/156.55 |

(Continued)

FOREIGN PATENT DOCUMENTS

| KR | 10-2000-0074293 A | 12/2000 |
| KR | 20000074293 A * | 12/2000 |

(Continued)

*Primary Examiner* — Alex W Mok
(74) *Attorney, Agent, or Firm* — Patent Office of Dr. Chung Park

(57) ABSTRACT

The present invention provides a high-speed motor for supplying high-output power by preparing a power transmission device, which increases rotational power at the front of a motor converting electrical energy into mechanical energy, so as to cause a rotary motion, obtain power, and supply the power, such that the power transmission device generates torque through an interaction of attraction and repulsion between a rotating magnetic field and a magnetic field generated by receiving the rotational power of the electric motor of receiving the rotational power of the electric motor and external electric power, thereby implementing a motor for transferring power with an increased number of revolutions and torque.

11 Claims, 11 Drawing Sheets

(51) Int. Cl.
 *H02K 49/10* (2006.01)
 *H02K 99/00* (2014.01)
(52) U.S. Cl.
 CPC ............... *H02K 7/11* (2013.01); *H02K 7/116* (2013.01); *H02K 49/102* (2013.01); *H02K 49/104* (2013.01); *H02K 99/00* (2016.11)
(58) Field of Classification Search
 CPC ...... H02K 49/102; H02K 49/104; H02K 7/11; H02K 99/20; H02K 16/00; H02K 16/02
 USPC ........................................................ 310/262
 See application file for complete search history.

(56) References Cited

U.S. PATENT DOCUMENTS 8,575,800 B1  11/2013  Fox et al.
2001/0013734 A1*  8/2001  Kanebako ........... F16C 32/0493
          310/90.5
2002/0117933 A1*  8/2002  Joong ..................... B60K 6/26
          310/261.1
2004/0090140 A1*  5/2004  Lai ....................... H02K 1/2793
          310/268
2009/0250280 A1*  10/2009  Abe ........................ B60K 6/26
          180/65.285
2010/0231079 A1*  9/2010  Abe ..................... H02K 1/2793
          310/156.35
2013/0313938 A1*  11/2013  Yamada ............... H02K 1/2713
          310/156.69
2015/0037180 A1  2/2015  Abbott

FOREIGN PATENT DOCUMENTS

KR  10-2005-0111732 A  11/2005
KR  20050111732 A  *  11/2005  .......... F16C 32/0457
WO  2014-176554 A2  10/2014

* cited by examiner

HIGH-SPEED MOTOR

CROSS-REFERENCE TO PRIOR APPLICATIONS

This application is a national Stage Patent Application of PCT International Patent Application No. PCT/KR2016/013751, filed on Nov. 28, 2016 under 35 U.S.C. § 371, which claims priority of Korean Patent Application No. 10-2015-0172841, filed on Dec. 6, 2015, which are all hereby incorporated by reference in their entirety.

TECHNICAL FIELD

The present invention relates to a high-speed motor that is provided with a power transmission device located at the front side of an electric motor to receive rotational power from the electric motor, produce a rotational force through magnetic fields, and enhance a rotational driving force.

BACKGROUND ART

Generally, an electric motor is a device that converts electrical energy into mechanical energy to cause a rotational motion, obtain rotational power from the rotational motion, and supply the rotational power.

So as to increase the output of the electric motor and the number of rotations thereof and supply the increased results, a rated capacity of the electric motor is increased to raise ouptput thereof and an inverter is used to perform voltage and frequency modulation. In this case, however, a general electric motor should be changed into an electric motor capable of performing frequency modulation, and if the rated capacity is increased, besides, the outer shapes of a rotor and a stator become bulky, large amounts of noise and heat are generated, and the amount of power consumed is increased. Due to the use of the converter for raising the number of rotations of the electric motor, further, the installation and operation costs for the frequency conversion are undesirably increased.

Even in case of an inverter motor performing multi-step speed operations, it has a limitation in frequency modulation, thereby making it hard to obtain the number of rotations of a given value or above. The output of motor is proportional to torque and the number of rotations thereof, and so as to obtain the number of rotations as required, accordingly, the electric motor whose rated capacity is increased and the inverter have to be used, which undesirably raising an operation cost. In case of the operation is kept at a high speed, further, noise may be generated and the electric motor may be overheated, and accordingly, there is a need to solve the problems.

DISCLOSURE

Technical Problem

Accordingly, the present invention has been made in view of the above-mentioned problems occurring in the prior art, and it is an object of the present invention to provide a high-speed motor, which converts electrical energy into mechanical energy to cause a rotational motion, obtain rotational power from the rotational motion, and supply the rotational power, including a power transmission device located at the front side of an electric motor to enhance a rotational driving force, so that the power transmission device produces a rotational force through the interaction of magnetic fields produced by receiving the rotational power from the electric motor or by receiving the rotational power from the electric motor and external power and transfers the rotational power to supply high output power.

It is another object of the present invention to provide a high-speed motor that includes an electric motor and a power transmission device located at the front side of the electric motor to enhance a rotational driving force, so that the power transmission device produces a rotational force through the interaction of magnetic fields produced by receiving rotational power from the electric motor or by receiving the rotational power from the electric motor and external power to enhance the number of rotations and rotational force thereof, thereby supplying high output power, reducing the capacity of the electric motor and the amounts of noise and heat generated, and decreasing the amount of electric power consumed.

Technical Solution

To accomplish the above-mentioned objects, according to a first aspect of the present invention, there is provided a high-speed motor including an electric motor and a power transmission device disposed at the front side of the electric motor to increase a rotational driving force.

At this time, the power transmission device includes a rotor module having a front rotor spaced apart from a front surface of a frame by a given distance in a direction of an axial line thereof in such a manner as to be disposed in a right angle direction and fitted to a shaft, the front rotor having permanent magnets spaced apart from each other by a given distance in a radial direction with respect to the axial line and disposed in a right angle direction to allow magnetic fluxes to be produced in the direction of the axial line of the shaft, and a driver module spaced apart from the front rotor by a given distance in the direction of the axial line of the shaft at the front side of the frame in such a manner as to be disposed in a right angle direction and having permanent magnets arranged in a radial direction with respect to the axial line around the front rotor in such a manner as to allow magnetic fluxes to be produced in the radial direction with respect to the axial line of the shaft, wherein the front side of the frame is mounted on the electric motor and the driver module is spaced apart from the front rotor by the given distance in the direction of the axial line of the frame at the front side of the frame in such a manner as to be disposed in the right angle direction and fitted to a shaft of the electric motor to receive the rotational power from the electric motor, and At this time, the front rotor of the rotor module faces the driver module to allow the magnetic fluxes of the permanent magnets of the front rotor to be produced in the direction of the axial line of the shaft and to allow the magnetic fluxes of the permanent magnets of the driver module to be produced in the radial direction with respect to the axial line of the shaft, so that through the interaction of attraction and repulsion between the rotating magnetic field produced by the rotation of the driver module fitted to the shaft of the electric motor and the rotating magnetic field produced by the front rotor, a rotational force is generated to increase the number of rotations and rotational power thereof.

On the other hand, the rotor module includes the frame configured to have a bearing mounting space and a bearing cooling space formed on the inner peripheral surface thereof around an axis of a cylindrical body and to have mounting surfaces formed on the front and rear surfaces of the cylindrical body to mount the driver module and the electric motor thereon, a bearing module for fitting bearings to the shaft in such a manner as to be supported against the frame, and the front rotor having a rotary plate having 2n (hereinafter, n is an integer) permanent magnet insertion holes formed equally spaced apart from each other with respect to a reference point on a circumferential axis of a disc-shaped body having a shaft through hole formed at the center thereof and 2n permanent magnets inserted into the 2n permanent magnet insertion holes with respect to the reference point of the rotary plate in such a manner where N and S poles are inserted alternately thereinto and magnetic fluxes are produced in the direction of the axial line of the shaft.

On the other hand, the driver module includes a fixing stand having a shaft through hole formed on a center of a cylindrical or disc-shaped body whose one side surface is closed and 2n or 3n (hereinafter, n is an integer greater than 2) permanent magnet insertion holes formed equally spaced apart from each other with respect to a reference point in the direction of an axial line with respect to the circumference thereof around the front rotor, and 2n or 3n permanent magnets inserted into the 2n or 3n permanent magnet insertion holes with respect to the reference point of the fixing stand in such a manner where N and S poles are inserted alternately thereinto or inserted thereinto with three-phase arrangements and magnetic fluxes are produced in the radial direction with respect to the axial line of the shaft.

On the other hand, the power transmission device is configured to allow the magnetic fluxes of the permanent magnets of the front rotor to be produced in the radial direction with respect to the axial line of the shaft and to allow the magnetic fluxes of the permanent magnets of the driver module to be produced in the direction of the axial line of the shaft.

To accomplish the above-mentioned objects, according to a second aspect of the present invention, there is provided a high-speed motor including the power transmission device to which a driver module is added.

At this time, the driver module is spaced apart from the front rotor by a given distance in the direction of an axial line behind the front rotor in such a manner as to be disposed in a right angle direction and mounted onto the front surface of the frame to receive the rotational power from the electric motor.

At this time, the front rotor of the rotor module faces the driver modules to allow the magnetic fluxes of the permanent magnets of the front rotor to be produced in the direction of the axial line of the shaft and to allow the magnetic fluxes of the permanent magnets of the driver modules disposed in front of the front rotor and behind the front rotor to be produced in the radial direction with respect to the axial line of the shaft, so that through the interaction of attraction and repulsion among the rotating magnetic field produced by the rotation of the driver module fitted to the shaft of the electric motor, the rotating magnetic field produced by the front rotor, and the magnetic field of the driver module mounted on the frame, a rotational force is generated to increase the number of rotations and the rotational power thereof.

On the other hand, the power transmission device is configured to allow the magnetic fluxes of the permanent magnets of the front rotor to be produced in the radial direction with respect to the axial line of the shaft and to allow the magnetic fluxes of the permanent magnets of the driver modules to be produced in the direction of the axial line of the shaft.

To accomplish the above-mentioned objects, according to a third aspect of the present invention, there is provided a high-speed motor including the power transmission device to which a rear rotor having permanent magnets having the same directions of magnetic fluxes as the front rotor and driver modules are added.

At this time, the rear rotor is spaced apart from the rear surface of the frame by a given distance in the direction of the axial line of the frame in such a manner as to be disposed in a right angle direction and fitted to the shaft, the permanent magnets of the rear rotor being arranged in the radial direction with respect to the axial line thereof, while having a given distance in the direction of the axial line of the shaft, in such a manner as to be disposed in the right angle direction to allow magnetic fluxes to be produced in the direction of the axial line of the shaft, and the driver modules being spaced apart from each other by a given distance in front of the rear rotor and behind the rear rotor in the direction of the axial line of the rear rotor in such a manner as to be disposed in a right angle direction and mounted on the rear surface of the frame to receive the rotational power from the electric motor, the permanent magnets of the driver modules being arranged in the direction of the axial line with respect to the circumference thereof around the rear rotor to allow magnetic fluxes to be produced in the radial direction with respect to the axial line of the shaft.

At this time, the front rotor and the rear rotor of the rotor module face the driver modules to allow the magnetic fluxes of the permanent magnets of the front rotor and the rear rotor to be produced in the direction of the axial line of the shaft and to allow the magnetic fluxes of the permanent magnets of the driver modules disposed in front of the front rotor and behind the front rotor to be produced in the radial direction with respect to the axial line of the shaft, so that through the interaction of attraction and repulsion among the rotating magnetic field produced by the rotation of the driver module fitted to the shaft of the electric motor, the rotating magnetic fields produced by the front rotor and the rear rotor, and the magnetic fields of the driver modules mounted on the frame, a rotational force is generated to increase the number of rotations and the rotational power thereof.

On the other hand, the rear rotor includes a rotary plate having 2n (hereinafter, n is an integer) permanent magnet insertion holes formed equally spaced apart from each other with respect to a reference point on a circumferential axis of a disc-shaped body having a shaft through hole formed at the center thereof and 2n permanent magnets inserted into the 2n permanent magnet insertion holes with respect to the reference point of the rotary plate in such a manner where N and S poles are inserted alternately thereinto and magnetic fluxes are produced in the direction of the axial line of the shaft.

On the other hand, the power transmission device is configured to allow the magnetic fluxes of the permanent magnets of the front rotor and the rear rotor to be produced in the radial direction with respect to the axial line of the shaft and to allow the magnetic fluxes of the permanent magnets of the driver modules to be produced in the direction of the axial line of the shaft.

To accomplish the above-mentioned objects, according to a fourth aspect of the present invention, there is provided a high-speed motor including the power transmission device to which a rear rotor having permanent magnets having the same directions of magnetic fluxes as the front rotor, a driver module, and an armature module having armatures as bunches of coils adapted to produce magnetic fluxes are added.

At this time, the rear rotor is spaced apart from the rear surface of the frame by a given distance in the direction of the axial line of the frame in such a manner as to be disposed in a right angle direction and fitted to the shaft, the permanent magnets of the rear rotor being arranged in the radial direction with respect to the axial line thereof, while having a given distance in the direction of the axial line of the shaft, in such a manner as to be disposed in the right angle direction to allow magnetic fluxes to be produced in the direction of the axial line of the shaft, the driver module and the armature module being spaced apart from each other by a given distance in front of the rear rotor and behind the rear rotor in the direction of the axial line of the rear rotor in such a manner as to be disposed in a right angle direction and mounted on the rear surface of the frame to receive the rotational power from the electric motor and external power, and the permanent magnets of the driver module and the armatures being arranged to allow magnetic fluxes to be produced in the radial direction with respect to the axial line of the shaft around the rear rotor to allow magnetic fluxes to be produced in the radial direction with respect to the axial line of the shaft.

At this time, the front rotor of the rotor module faces the driver modules and the rear rotor faces the driver module and the armature module to allow the magnetic fluxes of the permanent magnets of the front rotor and the rear rotor to be produced in the direction of the axial line of the shaft and to allow the magnetic fluxes of the permanent magnets of the driver modules and the magnetic fluxes of the armatures of the armature module to be produced in the radial direction with respect to the axial line of the shaft, so that through the interaction of attraction and repulsion among the rotating magnetic field produced by the rotation of the driver module fitted to the shaft of the electric motor, the rotating magnetic fields produced by the front rotor and the rear rotor, and the magnetic fields of the driver modules and the armature module mounted on the frame, a rotational force is generated to increase the number of rotations and the rotational power thereof.

On the other hand, the rear rotor includes a rotary plate having 2n (hereinafter, n is an integer) permanent magnet insertion holes formed equally spaced apart from each other with respect to a reference point on a circumferential axis of a disc-shaped body having a shaft through hole formed at the center thereof and 2n permanent magnets inserted into the 2n permanent magnet insertion holes with respect to the reference point of the rotary plate in such a manner where N and S poles are inserted alternately thereinto and magnetic fluxes are produced in the direction of the axial line of the shaft.

On the other hand, the armature module includes a fixing stand having a shaft through hole formed on a center of a cylindrical or disc-shaped body whose one side surface is closed and 2n or 3n (hereinafter, n is an integer greater than 2) armature insertion holes formed equally spaced apart from each other with respect to a reference point in the direction of an axial line and in a radial direction with respect to the circumference thereof around the rear rotor, and the 2n or 3n armatures as bunches of coils inserted into the 2n or 3n armature insertion holes with respect to the reference point of the fixing stand in such a manner where N and S poles are insertedly alternately bonded thereto or insertedly bonded thereto with three-phase arrangements and magnetic fluxes are produced in the radial direction with respect to the axial line of the shaft.

On the other hand, the power transmission device is configured to allow the magnetic fluxes of the permanent magnets of the front rotor and the rear rotor of the rotor module to be produced in the radial direction with respect to the axial line of the shaft and to allow the magnetic fluxes of the permanent magnets of the driver modules and the armatures of the armature module to be produced in the direction of the axial line of the shaft.

Advantageous Effects

According to the present invention, the high-speed motor, which converts electrical energy into mechanical energy to cause a rotational motion, obtain rotational power from the rotational motion, and supply the rotational power, includes the power transmission device located at the front side of the electric motor to enhance a rotational driving force, so that the power transmission device produces a rotational force through the interaction of magnetic fields produced by receiving rotational power from the electric motor or by receiving the rotational power from the electric motor and external power and transfers the rotational power to supply high output power.

According to the present invention, further, the high-speed motor includes the electric motor and the power transmission device located at the front side of the electric motor to enhance a rotational driving force, so that the power transmission device produces a rotational force through the interaction of magnetic fields produced by receiving rotational power from the electric motor or by receiving the rotational power from the electric motor and external power to enhance the number of rotations and rotational force thereof, thereby supplying high output power, reducing the capacity of the electric motor and the amounts of noise and heat generated, and decreasing the electric power consumed.

BEST MODE FOR INVENTION

Figure 1:
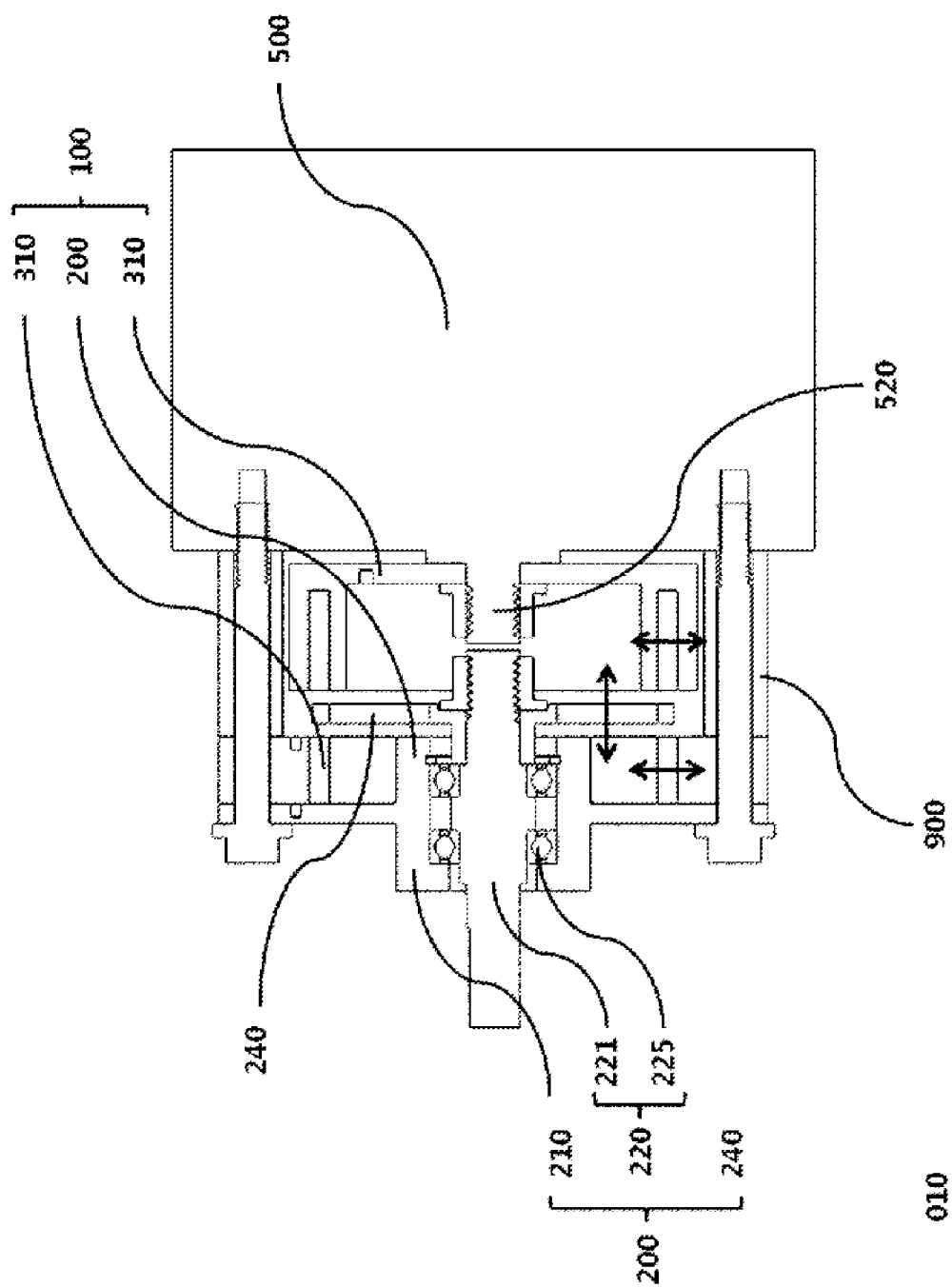
FIGS. 1 and 2 are sectional perspective views showing a high-speed motor according to a first embodiment of the present invention.
Figure 2:
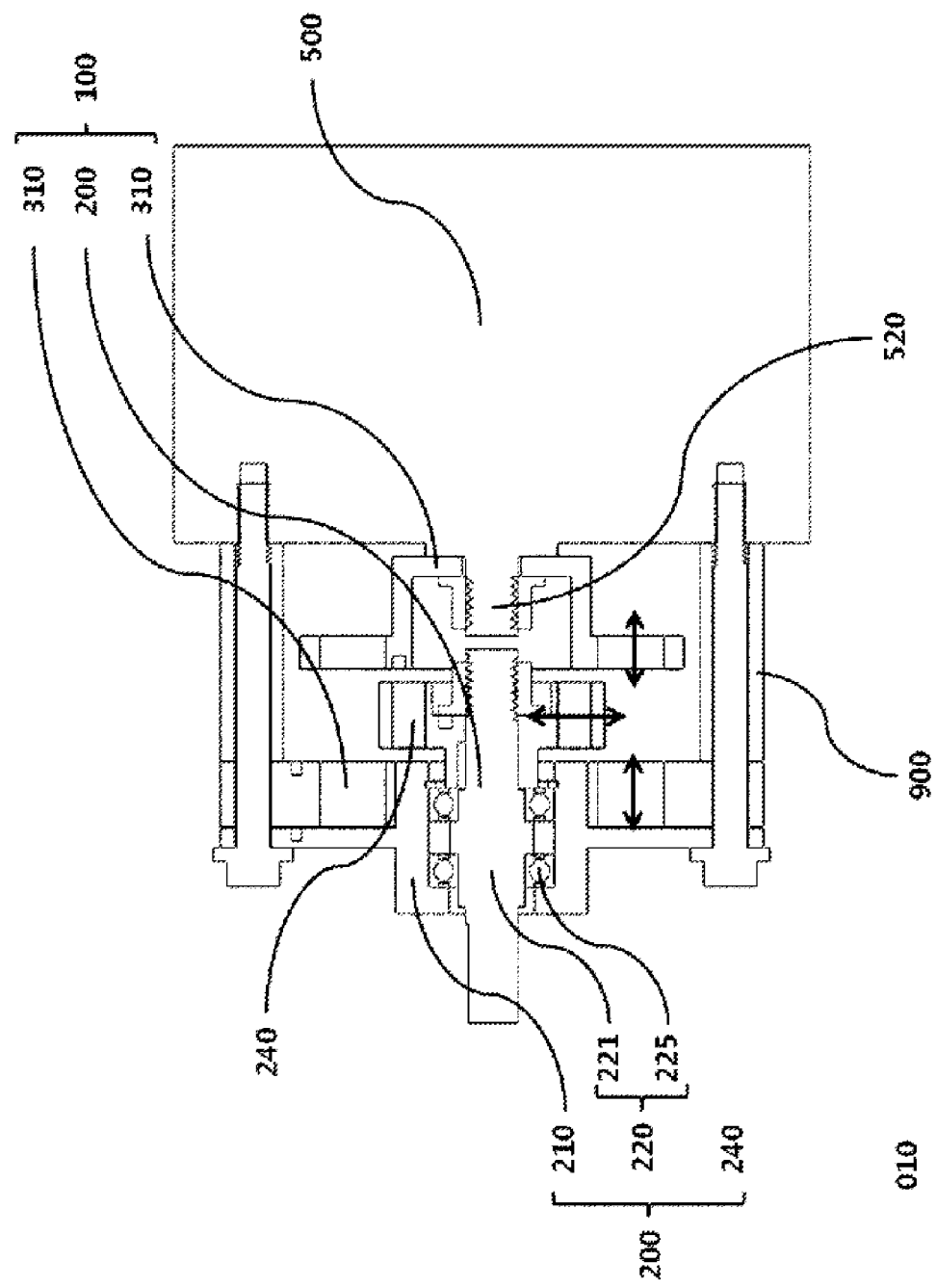
Figure 3:
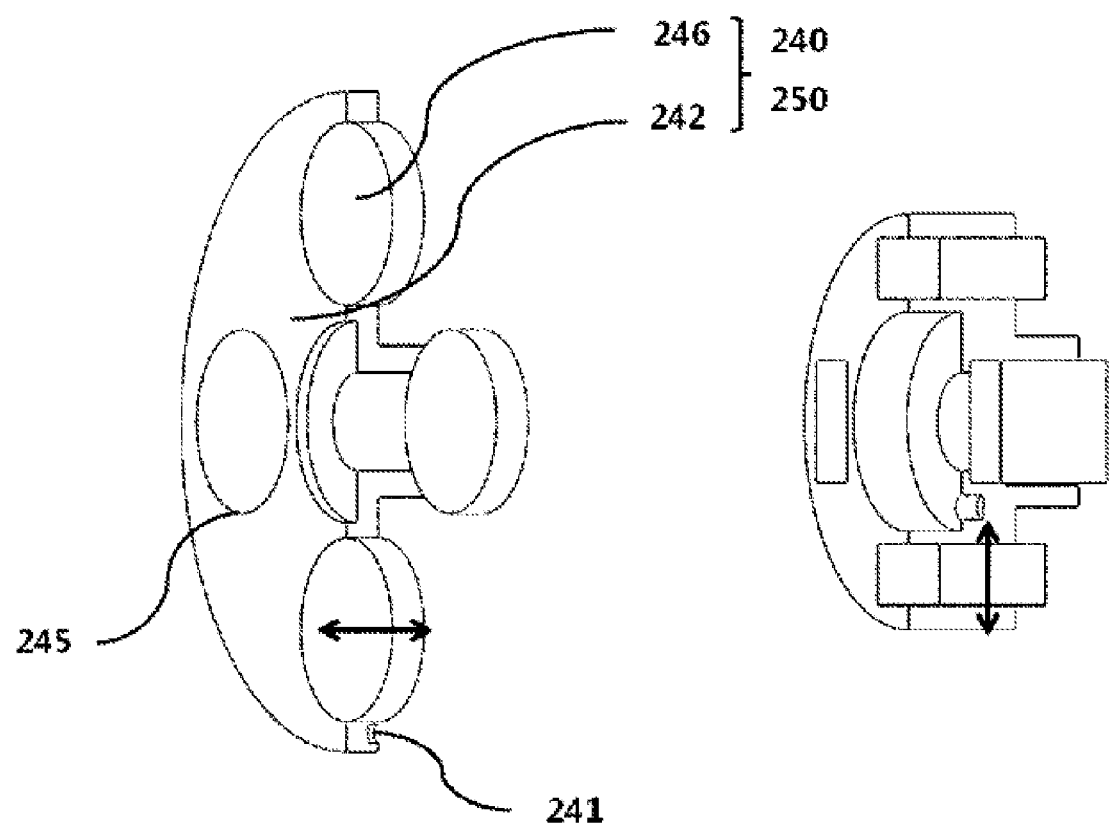
FIG. 3 is a sectional perspective view showing a front rotor and a rear rotor of the high-speed motor.
Figure 4:
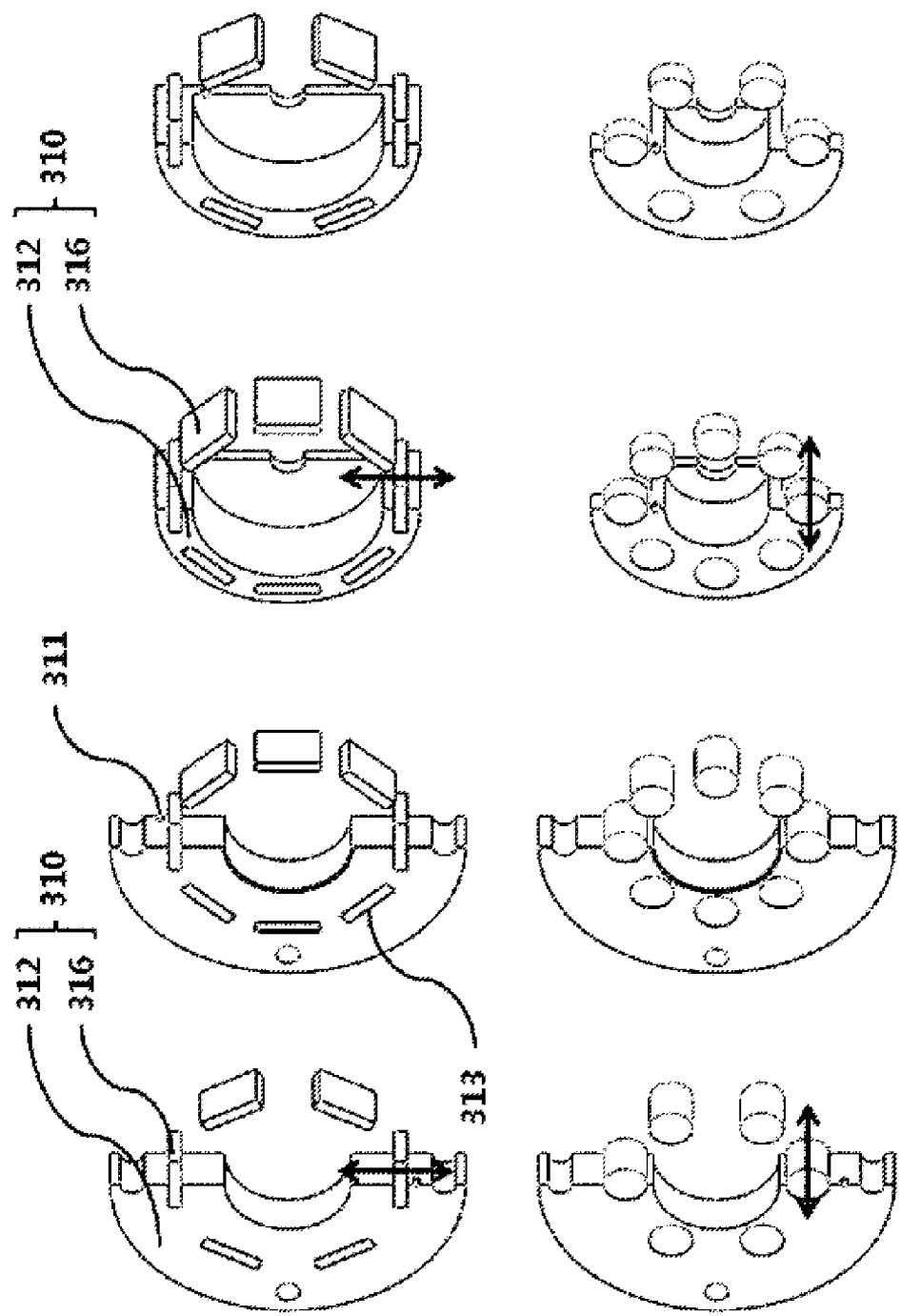
FIG. 4 is a sectional perspective view showing a driver module in the high-speed motor.
Figure 5:
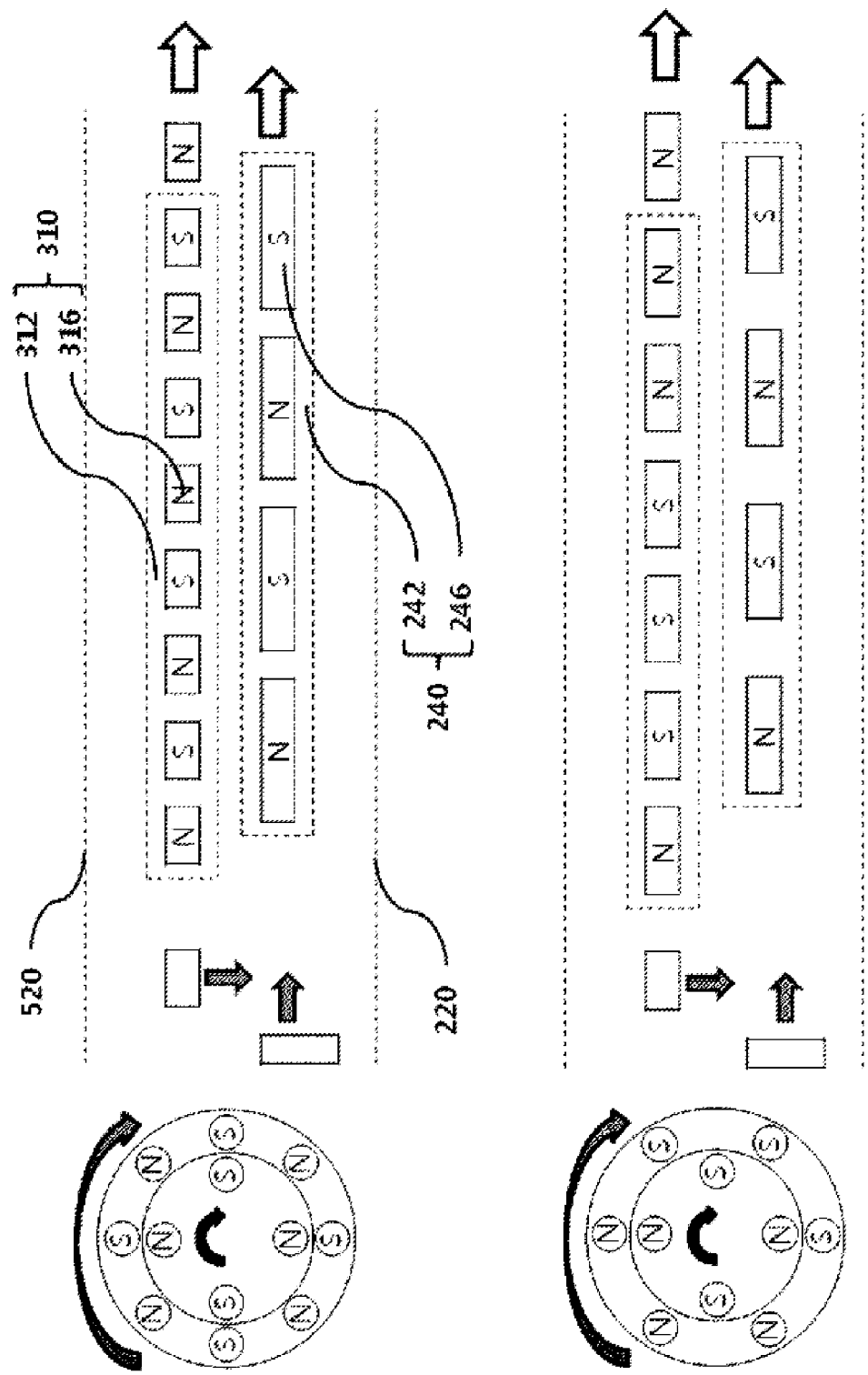
FIGS. 5 to 7 are views showing operations of a power transmission device in the high-speed motor.
Figure 6:
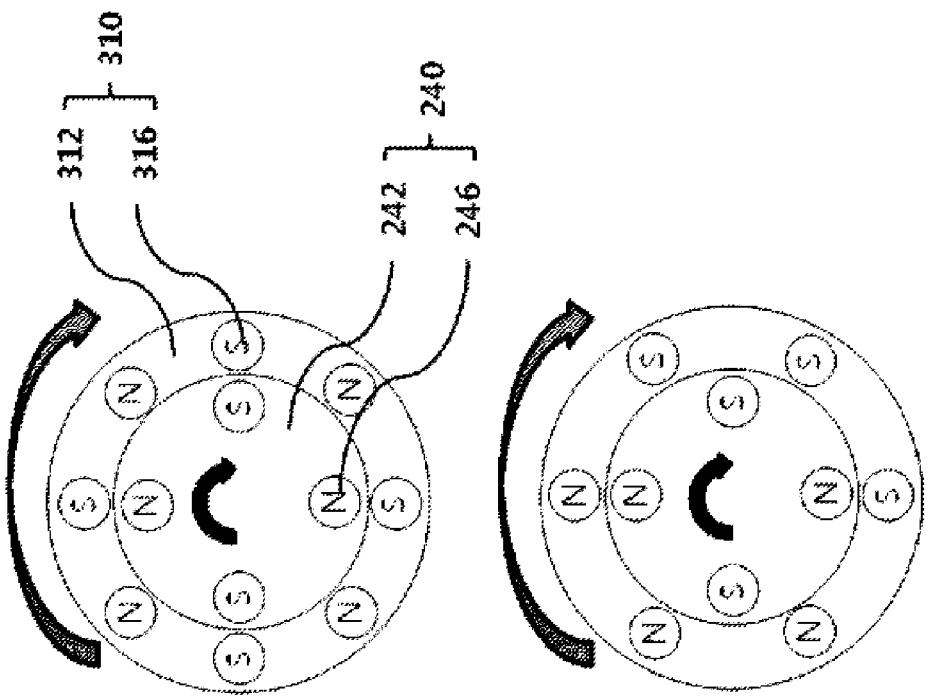
Figure 6:
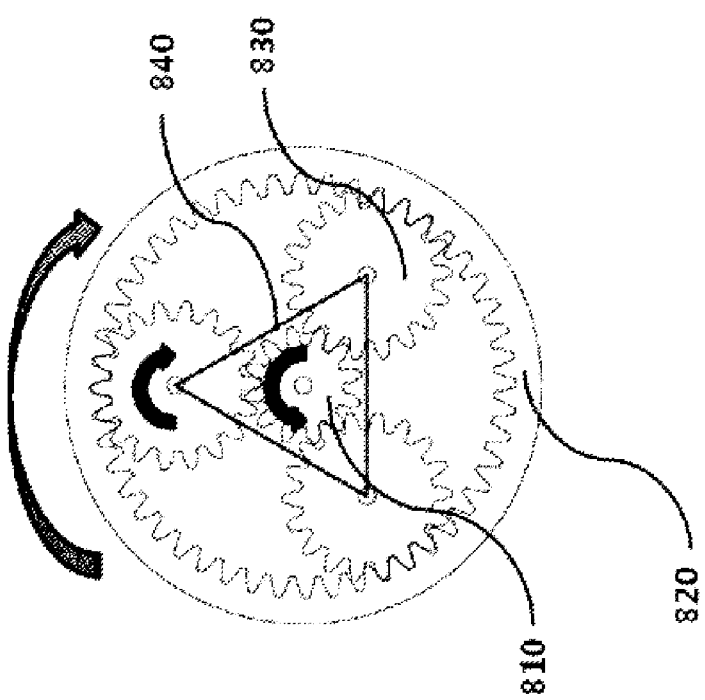
Figure 7:
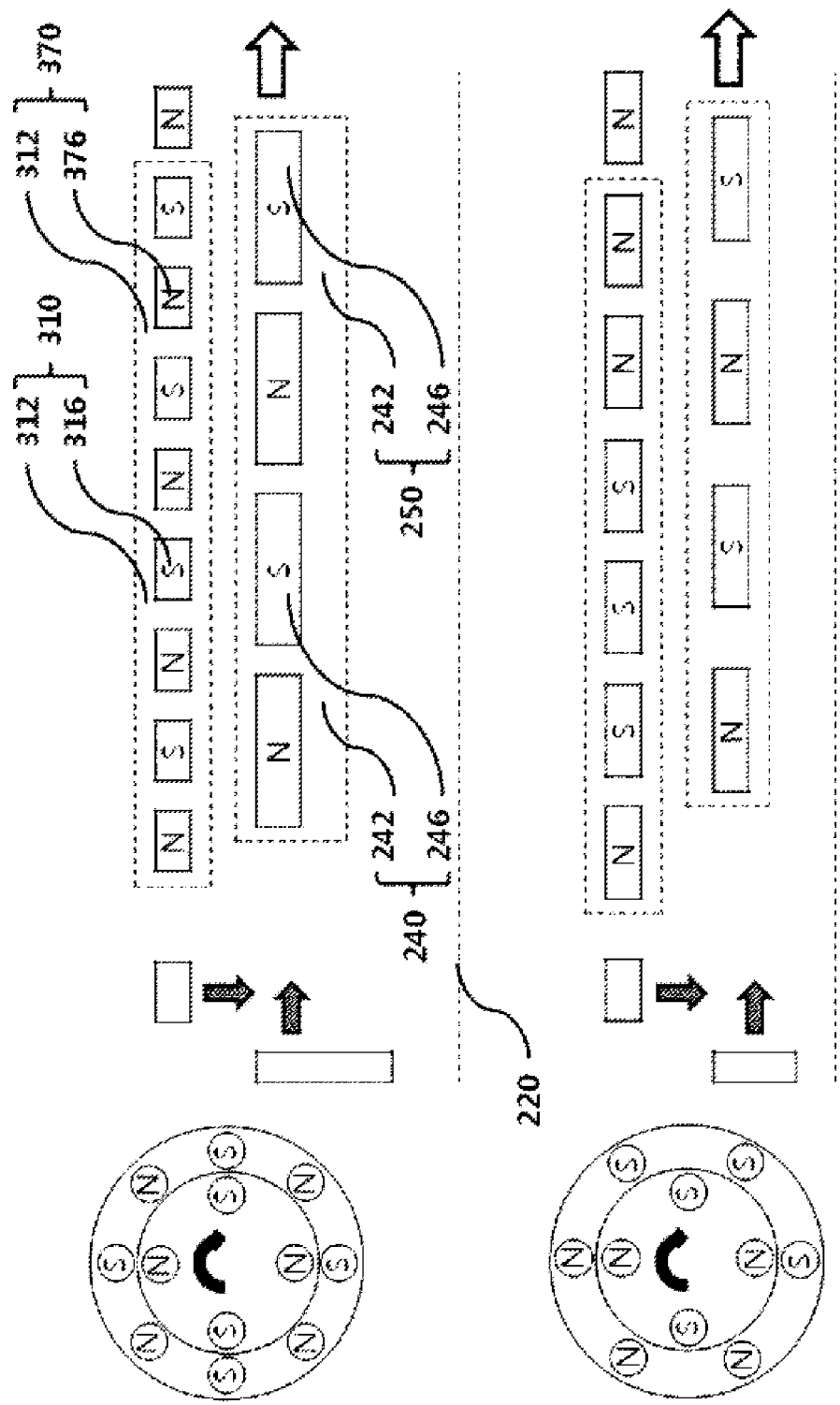

Hereinafter, the present invention is disclosed with reference to the attached drawings wherein the corresponding parts in the embodiments of the present invention are indicated by corresponding reference numerals and the repeated explanation on the corresponding parts will be avoided. FIGS. 1 and 2 are sectional perspective views showing a high-speed motor 010 according to a first embodiment of the present invention, FIGS. 3 and 4 are sectional perspective views showing parts of the high-speed motor according to the first embodiment of the present invention, and FIGS. 5 to 7 are views showing operations of a power transmission device 100 in the high-speed motor 010 according to the first embodiment of the present invention. First, the parts of the high-speed motor 010 according to the first embodiment of the present invention will be explained. The high-speed motor 010 according to the first embodiment of the present invention includes an electric motor 500 and the power transmission device 100 disposed at the front side of the electric motor 500 to increase a rotational driving force.

The power transmission device 100 includes a rotor module 200 having a front rotor 240 spaced apart from a front surface of a frame 210 by a given distance in a direction of an axial line thereof in such a manner as to be disposed in a right angle direction and fitted to a shaft 221, the front rotor 240 having permanent magnets 246 spaced apart from each other by a given distance in a radial direction with respect to the axial line and disposed in a right angle direction to allow magnetic fluxes to be produced in the direction of the axial line of the shaft 221, and driver modules 310 spaced apart from each other by a given distance in the direction of the axial line of the shaft 221 at the front and rear sides of the frame 210 in such a manner as to be disposed in a right angle direction and having permanent magnets 316 arranged in a radial direction with respect to the axial line around the front rotor 240 in such a manner as to allow magnetic fluxes to be produced in the radial direction with respect to the axial line of the shaft 221, wherein the front side of the frame 210 is mounted on the electric motor 500, one of the driver module 310 is spaced apart from the rear side of the front rotor 240 by a given distance in the direction of the axial line of the frame 210 at the front side of the frame 210 in such a manner as to be disposed in the right angle direction and mounted on the front surface of the frame 210, and the other is spaced apart from the front side of the front rotor 240 by a given distance in the direction of the axial line of the frame 210 at the front side of the frame 210 in such a manner as to be disposed in the right angle direction and fitted to a shaft 520 of the electric motor 500.

That is, the power transmission device 100 includes the rotor module 200 and the driver modules 310 disposed on the front and rear sides of the front rotor 240 of the rotor module 200.

Under the above-mentioned configuration, as shown in FIGS. 1, 2 and 3, the rotor module 200 includes a bearing module 220 having the shaft 221 mounted onto an axial line of a center of the frame 210 of a cylindrical body thereof and the front rotor 240 having the permanent magnets 246 spaced apart from the front surface of the frame 210 by the given distance in the direction of the axial line in such a manner as to be fitted to the shaft 221 of the bearing module 220.

In detail, the rotor module 200 includes the frame 210 configured to have a bearing mounting space and a bearing cooling space formed on the inner peripheral surface thereof around an axis of the cylindrical body thereof and to have mounting surfaces formed on the front and rear surfaces of the cylindrical body thereof to mount the driver module 310 and the electric motor 500 thereonto, the bearing module 220 for fitting bearings 225 to the shaft 221 in such a manner as to be supported against the frame 210, and the front rotor 240 fixedly fitted to the shaft 221 and having a rotary plate 242 having 2n (hereinafter, n is an integer) permanent magnet insertion holes 245 formed equally spaced apart from each other with respect to a reference point 241 on a circumferential axis of a disc-shaped body having a shaft through hole formed at the center thereof and 2n permanent magnets 246 inserted into the 2n permanent magnet insertion holes 245 with respect to the reference point 241 of the rotary plate 242 in such a manner where N and S poles are inserted alternately thereinto and magnetic fluxes are produced in the direction of the axial line of the shaft 221.

The frame 210 is configured to have the mounting space for the bearing module 220 and the bearing cooling space formed on the inner peripheral surface thereof around the axis of the cylindrical body thereof and to have the mounting surfaces formed on the front and rear surfaces of the cylindrical body thereof to mount the driver module 310 and the electric motor 500 thereonto, and the bearing module 220 is configured to have the bearings 225 fitted to the round rod-shaped shaft 221 to support the rotation of the shaft 221 thereagainst. Each bearing 225 of the bearing module 220 is any one selected from a grease supply cooling type bearing, an oil supply cooling type bearing, an air cooling type bearing, and a magnetic bearing, so that the bearing module 220 is not over an allowable limit that ensures fatigue life according to the maximum number of rotations of the front rotor 240.

As shown in FIG. 4, each driver module 310 includes a fixing stand 312 having a shaft through hole formed on a center of a cylindrical or disc-shaped body whose one side surface is closed and permanent magnet insertion holes 313 formed equally spaced apart from each other with respect to a reference point 311 thereof in the direction of an axial line with respect to the circumference thereof around the front rotor 240, and the permanent magnets 316 inserted into the permanent magnet insertion holes 311 with respect to the reference point 311 of the fixing stand 312 in such a manner where N and S poles are inserted alternately thereinto or inserted thereinto with three-phase arrangements.

In detail, each driver module 310 includes the fixing stand 312 having the shaft through hole formed on the center of the cylindrical or disc-shaped body whose one side surface is closed and the 2n or 3n (hereinafter, n is an integer greater than 2) permanent magnet insertion holes 313 formed equally spaced apart from each other with respect to the reference point 311 thereof in the direction of the axial line with respect to the circumference thereof around the front rotor 240, and the 2n or 3n permanent magnets 316 inserted into the 2n or 3n permanent magnet insertion holes 311 with respect to the reference point 311 of the fixing stand 312 in such a manner where N and S poles are inserted alternately thereinto or inserted thereinto with the three-phase arrangements and magnetic fluxes are produced in the radial direction with respect to the axial line of the shaft 221.

On the other hand, as shown in FIG. 2, the power transmission device 100 is desirably configured to allow the magnetic fluxes of the permanent magnets 246 of the front rotor 240 to be produced in the radial direction with respect to the axial line of the shaft 221 and to allow the magnetic fluxes of the permanent magnets 316 of the driver modules 310 to be produced in the direction of the axial line of the shaft 221.

Next, an explanation on the operation of the high-speed motor 010 according to the first embodiment of the present invention will be given. The high-speed motor 010 includes the electric motor 500 and the power transmission device 100 disposed at the front side of the electric motor 500 to increase rotational power of the electric motor 500. The power transmission device 100 includes the rotor module 200 having the front rotor 240 fitted to the shaft 221 of the bearing module 220 mounted onto the frame 210 and the driver modules 310 disposed on the front and rear sides of the front rotor 240.

The power transmission device 100 includes the rotor module 200 having the front rotor 240 spaced apart from the front surface of the frame 210 by the given distance in the direction of the axial line thereof in such a manner as to be disposed in the right angle direction and fitted to the shaft 221, the front rotor 240 having the permanent magnets 246 having magnetic fluxes produced in the direction of the axial line of the shaft 221 and the driver modules 310 spaced apart from the front rotor 240 by the given distance at the front and rear sides of the frame 210 in such a manner as to be disposed in the right angle direction and having the permanent magnets 316 arranged in the radial direction with respect to the axial line thereof around the front rotor 240 in such a manner as to allow magnetic fluxes to be produced in the radial direction with respect to the axial line of the shaft 221, wherein the front side of the frame 210 is mounted on the electric motor 500, one of the driver module 310 is mounted on the front surface of the frame 210, and the other is fitted to the shaft 520 of the electric motor 500 to receive the rotational power from the electric motor 500. A space ensuring adapter 900 is mounted between the rotor module 200 and the electric motor 500.

The driver module 310 fitted to the shaft 520 of the electric motor 500 is disposed to allow the magnetic fluxes to be produced in right angle directions with respect to the directions of the magnetic fluxes of the front rotor 240 of the rotor module 200.

That is, the 2n (n is an integer greater than 2) permanent magnets 246 of the front rotor 240 are arranged on the rotary plate 242 to allow N and S poles to be inserted alternately thereinto, so that they are arranged in the radial direction with respect to the axial line thereof, while having a given distance in the direction of the axial line of the bearing module 220, in such a manner as to be disposed in the right angle direction to allow magnetic fluxes to be produced in the direction of the axial line of the bearing module 220, and the 2n (n is an integer greater than 4) or 3n (n is an integer greater than 2) permanent magnets 316 of the driver module 310 are arranged on the fixing stand 312 to allow N and S poles to be inserted alternately into the fixing stand 312 or they are inserted thereinto with three-phase arrangements, so that they are spaced apart from the permanent magnets 246 of the front rotor 240 by a given distance in the direction of the axial line of the bearing module 220 in such a manner as to be arranged in the radial direction with respect to the axial line of the bearing module 220 around the permanent magnets 246 of the front rotor 240 to allow magnetic fluxes to be produced in the radial direction with respect to the axial line of the bearing module 220.

The 2n (n is an integer greater than 2) permanent magnets 246 of the front rotor 240 are arranged in such a manner where N and S poles are inserted alternately, so that they are arranged in the radial direction with respect to the axial line thereof, while having the given distance in the direction of the axial line of the bearing module 220, in such a manner as to be disposed in the right angle direction to allow magnetic fluxes to be produced in the direction of the axial line of the bearing module 220, and the 2n (n is an integer greater than 4) permanent magnets 316 of the driver module 310 are arranged in such a manner where N and S poles are inserted alternately, so that they are arranged in the radial direction with respect to the axial line of the bearing module 220 around the permanent magnets 246 of the front rotor 240 to allow magnetic fluxes to be produced in the radial direction with respect to the axial line of the bearing module 220. The above-mentioned arrangements of the permanent magnets 246 and the permanent magnets 316 will be explained below.

As shown in FIG. 5, the four permanent magnets 246 are arranged on the rotary plate 242 of the front rotor 240 in such a manner where the N and S poles are inserted alternately, and the eight permanent magnets 316 are arranged on the fixing stand 312 of the driver module 310 in such a manner where the N and S poles are inserted alternately. Now, the permanent magnets arranged on planes will be explained. In the state where the shaft 520 stops, the N-pole permanent magnets 246 of the front rotor 240 are located between the N poles and the S poles of the permanent magnets 316 of the driver module 310 or at positions facing the S poles of the permanent magnets 316, thereby obtaining balance in magnetic fields. The S-pole permanent magnets 246 of the front rotor 240 are located between the N poles and the S poles of the permanent magnets 316 of the driver module 310 or at positions facing the S poles of the permanent magnets 316, thereby obtaining balance in magnetic fields.

If the shaft 520 rotates, the permanent magnets 316 of the driver module 310 fitted to the shaft 520 rotate to produce a rotational force through rotating magnetic fields of attraction and repulsion with a phase of 90° with respect to the permanent magnets 246 of the front rotor 240, thereby acceleratedly rotating the front rotor 240.

Accordingly, the driver module 310 receives the rotational power from the shaft 520 and thus rotates by creating an imaginary magnetic field rotational moment axis along which the N and S poles of the permanent magnets 315 are arranged alternately to allow the magnetic fluxes to be produced in the radial direction with respect to the axial line of the shaft 520, and the front rotor 240 creates an imaginary magnetic field rotational moment axis along which the N and S poles of the permanent magnets 246 are arranged alternately to allow the magnetic fluxes to be produced in the axial line of the bearing module 220, so that through the interaction of attraction and repulsion between the rotating magnetic field produced by the rotation of the driver module 310 and the rotating magnetic field produced by the rotation of the front rotor 240, a rotational force of a planetary motion is produced to acceleratedly rotate the front rotor 240.

Further, the 2n (n is an integer greater than 2) permanent magnets 246 of the front rotor 240 are arranged in such a manner where the N and S poles are inserted alternately, so that they are arranged in the radial direction with respect to the axial line thereof, while having the given distance in the direction of the axial line of the bearing module 220, in such a manner as to be disposed in the right angle direction to allow the magnetic fluxes to be produced in the direction of the axial line of the bearing module 220, and the 3n (n is an integer greater than 2) permanent magnets 316 of the driver module 310 are arranged in such a manner where the N and S poles are inserted with the three-phase arrangements, so that they are arranged in the radial direction with respect to the axial line of the bearing module 220 to allow the magnetic fluxes to be produced in the radial direction with respect to the axial line of the bearing module 220. The above-mentioned arrangements of the permanent magnets 246 and the permanent magnets 316 will be explained below.

The four permanent magnets 246 are arranged on the rotary plate 242 of the front rotor 240 in such a manner where the N and S poles are inserted alternately, and the six permanent magnets 316 are arranged on the fixing stand 312 of the driver module 310 in such a manner where the N, N, and N poles and the S, S and S poles are inserted alternately with the three-phase arrangements. Now, the permanent magnets arranged on planes will be explained. In the state where the shaft 520 stops, the N-pole permanent magnets 246 of the front rotor 240 are located between the N poles and the S poles and the S poles and the N poles of the permanent magnets 316 of the driver module 310 or at positions facing the S poles and the N poles of the permanent magnets 316, thereby obtaining balance in magnetic fields. The S-pole permanent magnets 246 of the front rotor 240 are located to face the S poles and the N poles of the permanent magnets 316 of the driver module 310 or between the S poles and the S poles and between the N poles and the N poles of the permanent magnets 316 of the driver module 310, thereby obtaining magnetic balance.

If the shaft 520 rotates, the permanent magnets 316 of the driver module 310 fitted to the shaft 520 rotate to produce a rotational force through rotating magnetic fields of attraction and repulsion with a phase of 120° with respect to the permanent magnets 246 of the front rotor 240, thereby acceleratedly rotating the front rotor 240.

Accordingly, the driver module 310 receives the rotational power from the shaft 520 and rotates by creating an imaginary magnetic field rotational moment axis along which the N, N, and N poles and the S, S and S poles are inserted alternately with the three-phase arrangements to allow the magnetic fluxes to be produced in the radial direction with respect to the axial line of the shaft 520, and the front rotor 240 creates an imaginary magnetic field rotational moment axis along which the N and S poles of the permanent magnets 246 are arranged alternately to allow the magnetic fluxes to be produced in the axial line of the bearing module 220, so that through the interaction of attraction and repulsion between the rotating magnetic field produced by the rotation of the driver module 310 and the rotating magnetic field produced by the rotation of the front rotor 240, a rotational force of a planetary motion is produced to acceleratedly rotate the front rotor 240.

For example, as shown in FIG. 6, if a ring gear 820 rotates in planetary gear trains, planetary gears 830 of a planetary gear carrier 840 face a sun gear 810 to uniformly push the sun gear 810 thereagainst, thereby acceleratedly rotating the sun gear 810. In the same manner as above, according to the present invention, the front rotor 240 of the rotor module 200 faces the driver modules 310, the magnetic fluxes of the permanent magnets 246 of the front rotor 240 are produced in the direction of the axial line of the shaft 221, and the magnetic fluxes of the permanent magnets 316 of the driver modules 310 are produced in the radial direction with respect to the axial line of the shaft 221, so that the rotating magnetic fields of the driver modules 310 and the rotating magnetic field of the front rotor 240 are produced as the interaction of attraction and repulsion therebetween in the form of the planetary motion to acceleratedly rotate the front rotor 240.

On the other hand, the front rotor 240 is disposed to allow the magnetic fluxes to be produced in right angle directions to the directions of the magnetic fluxes of the driver module 310 mounted onto the front surface of the frame 210 behind the front rotor 240.

That is, the 2n (n is an integer greater than 2) permanent magnets 246 of the front rotor 240 are arranged on the rotary plate 242 to allow the N and S poles to be inserted alternately, so that they are arranged in the radial direction with respect to the axial line thereof, while having a given distance in the direction of the axial line of the bearing module 220, in such a manner as to be disposed in the right angle direction to allow magnetic fluxes to be produced in the direction of the axial line of the bearing module 220, and the 2n (n is an integer greater than 4) or 3n (n is an integer greater than 2) permanent magnets 316 of the driver module 310 are arranged on the frame 210 to allow the N and S poles to be inserted alternately or they are inserted thereinto with three-phase arrangements, so that they are spaced apart from the permanent magnets 246 of the front rotor 240 by a given distance in the direction of the axial line of the bearing module 220 in such a manner as to be arranged in the radial direction with respect to the axial line of the bearing module 220 around the permanent magnets 246 of the front rotor 240 to allow magnetic fluxes to be produced in the radial direction with respect to the axial line of the bearing module 220.

The 2n (n is an integer) permanent magnets 246 of the front rotor 240 are arranged in such a manner where the N and S poles are inserted alternately, so that the magnetic fluxes are produced in the direction of the axial line of the bearing module 220, and the 2n (n is an integer greater than 2) permanent magnets 316 of the driver module 310 are arranged in such a manner where the N and S poles are inserted alternately, so that the magnetic fluxes are produced in right angle directions to the directions of the magnetic fluxes of the permanent magnets 246 of the front rotor 240. The above-mentioned arrangements of the permanent magnets 246 and the permanent magnets 316 will be explained below.

As shown in FIG. 7, the four permanent magnets 246 are arranged on the rotary plate 242 of the front rotor 240 in such a manner where the N and S poles are inserted alternately, and the eight permanent magnets 316 of the driver module 310 are arranged in such a manner where the N and S poles are inserted alternately into the permanent magnet insertion holes of the frame 210. Now, the permanent magnets arranged on planes will be explained. In the state where the driver module 310 stops, the N-pole permanent magnets 246 of the front rotor 240 are located between the N poles and the S poles of the permanent magnets 316 of the driver module 310 or at positions facing the S poles of the permanent magnets 316, thereby obtaining balance in magnetic fields. The S-pole permanent magnets 246 of the front rotor 240 are located between the N poles and the S poles of the permanent magnets 316 of the driver module 310 or at positions facing the S poles of the permanent magnets 316, thereby obtaining balance in magnetic fields.

If the front rotor 240 rotates by the rotational force of the rotating magnetic field made by the rotation of the driver module 310 and is thus acceleratedly moved to a direction of an arrow, the permanent magnets 246 of the front rotor 240 are moved at the same time to the direction of the arrow and thus obtain a driving force from the magnetic field through the attraction and repulsion with a phase of 90° with respect to the permanent magnets 316 of the driver module 310, so that the front rotor 240 becomes accelerated.

Accordingly, the front rotor 240 receives the rotational power from the front side driver module 310 and rotates by creating an imaginary magnetic field rotational moment axis along which the N and S poles of the permanent magnets 246 are arranged alternately to allow the magnetic fluxes to be produced in the direction of the axial line of the bearing module 220, and the driver module 310 creates a magnetic field wherein the N and S poles of the permanent magnets 316 are arranged alternately to allow the magnetic fluxes to be produced in the radial direction with respect to the axial line of the bearing module 220, so that through the interaction of attraction and repulsion between the rotating magnetic field produced by the rotation of the front rotor 240 and the magnetic field produced by the driver module 310 around the front rotor 240, a rotational force is produced to acceleratedly rotate the front rotor 240.

Further, the 2n (n is an integer greater than 2) permanent magnets 246 of the front rotor 240 are arranged in such a manner where the N and S poles are inserted alternately, so that they are arranged in the radial direction with respect to the axial line thereof, while having the given distance in the direction of the axial line of the bearing module 220, in such a manner as to be disposed in the right angle direction to allow the magnetic fluxes to be produced in the direction of the axial line of the bearing module 220, and the 3n (n is an integer greater than 2) permanent magnets 316 of the driver module 310 are arranged in such a manner where the N and S poles are inserted with the three-phase arrangements, so that they are arranged in the radial direction with respect to the axial line of the bearing module 220 to allow the magnetic fluxes to be produced in the radial direction with respect to the axial line of the bearing module 220. The above-mentioned arrangements of the permanent magnets 246 and the permanent magnets 316 will be explained below.

The four permanent magnets 246 are arranged on the rotary plate 242 of the front rotor 240 in such a manner where the N and S poles are inserted alternately, and the six permanent magnets 316 are arranged on the frame 210 in such a manner where the N, N, and N poles and the S, S and S poles are inserted alternately into the permanent magnet insertion holes of the frame 210 with the three-phase arrangements. Now, the permanent magnets arranged on planes will be explained. In the state where the driver module 310 stops, the N-pole permanent magnets 246 of the front rotor 240 are located between the N poles and the S poles and the S poles and the N poles of the permanent magnets 316 of the driver module 310 or at positions facing the S poles and the N poles of the permanent magnets 316, thereby obtaining balance in magnetic fields. The S-pole permanent magnets 246 of the front rotor 240 are located to face the S poles and the N poles of the permanent magnets 316 of the driver module 310 or between the S poles and the S poles and between the N poles and the N poles of the permanent magnets 316 of the driver module 310, thereby obtaining magnetic balance.

If the front rotor 240 rotates by the rotational force of the rotating magnetic field made by the rotation of the driver module 310 and is thus acceleratedly moved to the direction of an arrow, the permanent magnets 246 of the front rotor 240 are moved at the same time to the direction of the arrow and thus obtain a driving force from the magnetic field through the attraction and repulsion with a phase of 120° with respect to the permanent magnets 316 of the driver module 310, so that the front rotor 240 becomes accelerated.

Accordingly, the front rotor 240 receives the rotational power from the front side driver module 310 and rotates by creating an imaginary magnetic field rotational moment axis along which the N and S poles of the permanent magnets 246 are arranged alternately to allow the magnetic fluxes to be produced in the direction of the axial line of the bearing module 220, and the driver module 310 creates a magnetic field wherein the N, N, and N poles and the S, S and S poles are located with the three-phase arrangements to allow the magnetic fluxes to be produced in the radial direction with respect to the axial line of the bearing module 220, so that through the interaction of attraction and repulsion between the rotating magnetic field produced by the rotation of the front rotor 240 and the magnetic field produced by the driver module 310 around the front rotor 240, a rotational force is produced to acceleratedly rotate the front rotor 240.

For example, if wheels of a magnetic levitation train are driven by a motor to allow the train to be accelerated over a given speed, the train is driven by a magnetic field produced from an electromagnetic force between armatures installed in the train and reaction plates equally spaced apart from each other in such a manner as to face the armatures. An example where the driving way of the magnetic levitation train is applied to the present invention will be explained below. According to the present invention, the front rotor 240 faces the driver modules 310 in such a manner where the magnetic fluxes of the permanent magnets 246 of the front rotor 240 are produced in the direction of the axial line of the shaft 221 and the magnetic fluxes of the permanent magnets 316 of the driver modules 310 are produced in the radial direction with respect to the axial line of the shaft 221, and thus, the front rotor 240 acceleratedly rotates through the interaction of attraction and repulsion between the rotating magnetic field of the front rotor 240 and the magnetic fields of the driver modules 310.

Under the above-mentioned configuration of the high-speed motor 010, the induced magnetic field produced by the rotation of the driver module 310 fitted to the shaft 520 of the electric motor 500 with the rotational power supplied from the electric motor 500, the rotating magnetic field produced by the front rotor 240, and the magnetic field of the driver module 310 fitted to the front surface of the frame 210 are perpendicular to each other to generate a rotational force through the interaction of the attraction and repulsion therebetween, thereby enhancing the number of rotations and the rotational force of the high-speed motor 010 to provide high output and power.

With the rotational power of the electric motor 500, accordingly, the front rotor 240 faces the driver module 310 in such a manner where the magnetic fluxes of the permanent magnets 246 are produced in the direction of the axial line of the shaft 221 and the magnetic fluxes of the permanent magnets 316 are produced in the radial direction with respect to the axial line of the shaft 221, and thus, a rotational force is produced through the interaction of attraction and repulsion between the rotating magnetic fields produced by the rotation of the driver module 310 and the front rotor 240 and the magnetic field of the driver module 310 fitted to the frame 210, thereby enhancing the number of rotations and the rotational force of the high-speed motor 010 to provide high output and power.

On the other hand, as shown in FIG. 2, even though the power transmission device 100 is configured to allow the magnetic fluxes of the permanent magnets 246 of the front rotor 240 to be produced in the radial direction with respect to the axial line of the shaft 221 and the magnetic fluxes of the permanent magnets 316 of the driver modules 310 are produced in the direction of the axial line of the shaft 221, the same effects as mentioned above may be provided.

The rotational force of the power transmission device 100 is determined by adjusting magnetic densities of the permanent magnets, contact areas of the magnetic fields, and gaps of the permanent magnets facing in right angle directions in such a manner as to have given gaps with the mounting diameter pitches of the permanent magnets.

Further, the power transmission device 100 is driven with the rotational force of the magnetic field produced through the interaction of the attraction and repulsion of the permanent magnets, so that a high driving efficiency is provided, thereby achieving reduction of noise, good durability, and no driving cost.

Mode for Invention

Figure 8:
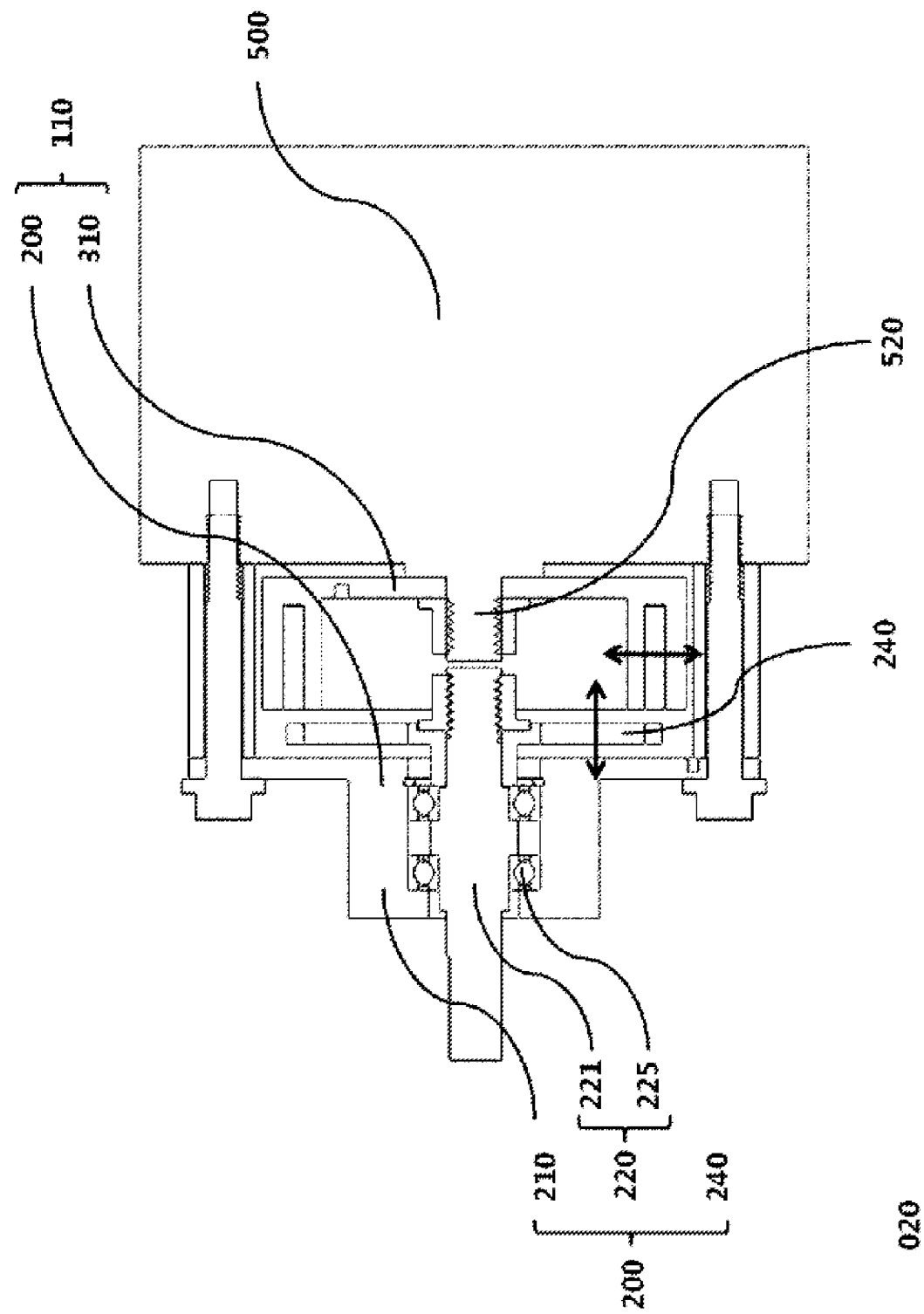
FIG. 8 is a sectional perspective view showing a high-speed motor according to a second embodiment of the present invention.

Now, an explanation on a second embodiment of the present invention will be given. FIG. 8 is a sectional perspective view showing a high-speed motor 020 according to the second embodiment of the present invention, and FIGS. 5 to 7 show the operations of a power transmission device 110. First, the parts of the high-speed motor 020 will be explained. The high-speed motor 020 according to the second embodiment of the present invention includes an electric motor 500 and the power transmission device 110 disposed at the front side of the electric motor 500 to increase a rotational driving force.

The power transmission device 110 includes the rotor module 200 and the driver module 310 in the first embodiment of the present invention, and the driver module 310 is fitted to the shaft 520 of the electric motor 500.

That is, the power transmission device 110 is configured to have the driver module 310 disposed only in front of the front rotor 240 of the rotor module 200.

On the other hand, the power transmission device 110 may be desirably configured to allow the magnetic fluxes of the permanent magnets 246 of the front rotor 240 to be produced in the radial direction with respect to the axial line of the shaft 221 and to allow the magnetic fluxes of the permanent magnets 316 of the driver module 310 to be produced in the direction of the axial line of the shaft 221.

Next, an explanation on the operations of the high-speed motor 020 according to the second embodiment of the present invention will be given. In the same manner as the first embodiment of the present invention, the power transmission device 110 receives the rotational power from the electric motor 500. A space ensuring adapter may be mounted between the rotor module 200 and the electric motor 500.

Under the above-mentioned configuration of the high-speed motor 020, in the same manner as the first embodiment of the present invention, the high-speed motor 020 operates with the rotational power supplied from the electric motor 500, and thus, a rotational force is produced through the interaction of the attraction and repulsion between the rotating magnetic field produced by the rotation of the driver module 310 fitted to the shaft 520 of the electric motor 500 and the rotating magnetic field produced by the front rotor 240, thereby enhancing the number of rotations and the rotational force thereof to provide high output and power.

On the other hand, even though the power transmission device 110 is configured to allow the magnetic fluxes of the permanent magnets 246 of the front rotor 240 to be produced in the radial direction with respect to the axial line of the shaft 221 and to allow the magnetic fluxes of the permanent magnets 316 of the driver module 310 to be produced in the direction of the axial line of the shaft 221, the same effects as mentioned above may be provided.

Figure 9:
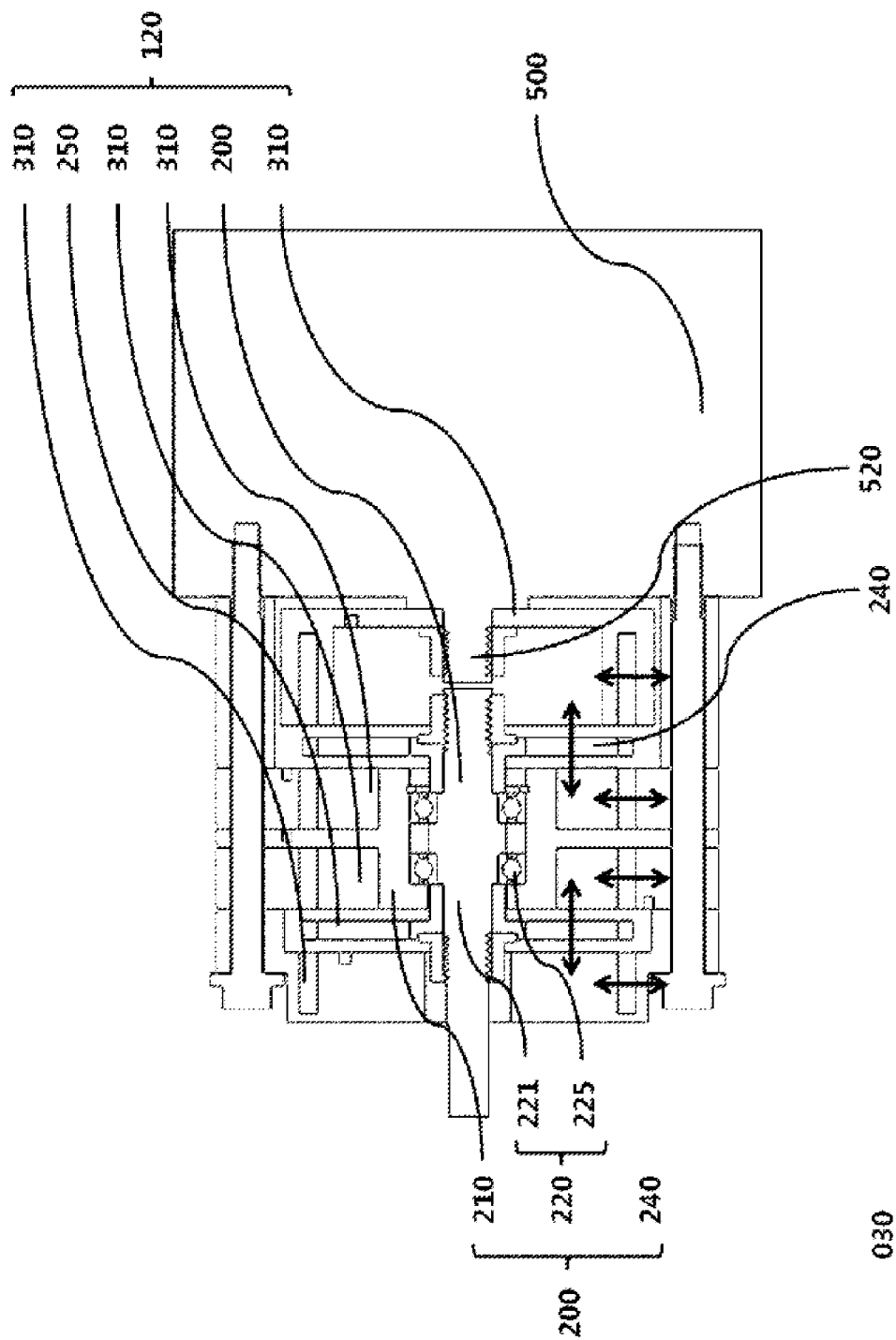
FIG. 9 is a sectional perspective view showing a high-speed motor according to a third embodiment of the present invention.

Now, an explanation on a third embodiment of the present invention will be given. FIG. 9 is a sectional perspective view showing a high-speed motor 030 according to the third embodiment of the present invention, and FIGS. 5 to 7 show the operations of a power transmission device 120. First, the parts of the high-speed motor 030 will be explained. The high-speed motor 030 according to the third embodiment of the present invention includes the electric motor 500 and the power transmission device 120 disposed at the front side of the electric motor 500 to increase a rotational driving force.

The power transmission device 120 adds a rear rotor 250 having permanent magnets 246 having the same directions of magnetic fluxes as those of the front rotor 240 and driver modules 310 to the power transmission device 110 according to the first embodiment of the present invention or to the power transmission device 120 according to the second embodiment of the present invention. The rear rotor 250 is spaced apart from the rear surface of the frame 210 by a given distance in the direction of the axial line of the frame 210 in such a manner as to be disposed in a right angle direction and fitted to the shaft 221, the permanent magnets 246 of the rear rotor 250 being arranged in the radial direction with respect to the axial line thereof, while having a given distance in the direction of the axial line of the shaft 221, in such a manner as to be disposed in the right angle direction to allow magnetic fluxes to be produced in the direction of the axial line of the shaft 221, and the driver modules 310 are spaced apart from each other by a given distance in front of the rear rotor 250 and behind the rear rotor 250 in the direction of the axial line of the rear rotor 250 in such a manner as to be disposed in a right angle direction and mounted on the rear surface of the frame 210, the permanent magnets 316 of the driver modules 310 being arranged in the radial direction with respect to the axial line thereof around the rear rotor 250 to allow magnetic fluxes to be produced in the radial direction with respect to the axial line of the shaft 221.

That is, the power transmission device 120 is configured to add the rear rotor 250 and the driver modules 310 disposed in front of the rear rotor 250 and behind the rear rotor 250 to the power transmission device 110 according to the first embodiment of the present invention or to the power transmission device 120 according to the second embodiment of the present invention.

As shown in FIG. 3, the rear rotor 250 includes a rotary plate 242 having permanent magnet insertion holes 245 formed equally spaced apart from each other with respect to a reference point 241 on a circumferential axis of a disc-shaped body having a shaft through hole formed at the center thereof, the permanent magnet insertion holes 245 being formed on the same circumferential axis as the front rotor 240, and permanent magnets 246 inserted into the permanent magnet insertion holes 245 with respect to the reference point 241 of the rotary plate 242 in such a manner where N and S poles are inserted alternately thereinto.

In detail, the rear rotor 250 includes the rotary plate 242 having the 2n (hereinafter, n is an integer) permanent magnet insertion holes 245 formed equally spaced apart from each other with respect to the reference point 241 on the circumferential axis of the disc-shaped body having the shaft through hole formed at the center thereof and the 2n permanent magnets 246 inserted into the permanent magnet insertion holes 245 with respect to the reference point 241 of the rotary plate 242 in such a manner where the N and S poles are inserted alternately thereinto and magnetic fluxes are produced in the direction of the axial line of the shaft 221.

On the other hand, the power transmission device 120 may be desirably configured to allow the magnetic fluxes of the permanent magnets 246 of the front rotor 240 and the magnetic fluxes of the permanent magnets 246 of the rear rotor 250 to be produced in the radial direction with respect to the axial line of the shaft 221 and to allow the magnetic fluxes of the permanent magnets 316 of the driver modules 310 to be produced in the direction of the axial line of the shaft 221.

Next, an explanation on the operation of the high-speed motor 030 will be given. In addition to the power transmission device 110 according to the first embodiment of the present invention or to the power transmission device 120 according to the second embodiment of the present invention, the power transmission device 120 is configured to have the rear rotor 250 spaced apart from the rear surface of the frame 210 by the given distance in the direction of the axial line of the frame 210 in such a manner as to be disposed in a right angle direction and fitted to the shaft 221 to allow the magnetic fluxes of the permanent magnets 246 thereof to be produced in the direction of the axial line of the shaft 221, and to have the driver modules 310 spaced apart from each other by the given distance in front of the rear rotor 250 and behind the rear rotor 250 in such a manner as to be disposed in a right angle direction and mounted on the rear surface of the frame 210 to allow the magnetic fluxes of the permanent magnets 316 thereof to be produced in the radial direction with respect to the axial line of the shaft 221. A space ensuring adapter may be mounted between the rotor module 200 and the electric motor 500.

The rear rotor 250 fitted to the same shaft 221 as the front rotor 240 is driven through the interaction of attraction and repulsion with the driver modules 310, in the same manner as the front rotor 240 as shown in FIG. 7 driven through the interaction.

Under the above-mentioned configuration of the high-speed motor 030, in the same manner as the first embodiment of the present invention, the high-speed motor 030 operates with the rotational power supplied from the electric motor 500, and thus, a rotational force is produced through the interaction of the attraction and repulsion among the rotating magnetic field produced by the rotation of the driver module 310 fitted to the shaft 520 of the electric motor 500, the rotating magnetic fields produced by the front rotor 240 and the rear rotor 250, and the magnetic fields of the driver modules 310 mounted on the frame 210, thereby enhancing the number of rotations and the rotational force thereof to provide high output and power.

On the other hand, even though the power transmission device 120 is configured to allow the magnetic fluxes of the permanent magnets 246 of the front rotor 240 and the magnetic fluxes of the permanent magnets 246 of the rear rotor 250 to be produced in the radial direction with respect to the axial line of the shaft 221 and to allow the magnetic fluxes of the permanent magnets 316 of the driver modules 310 to be produced in the direction of the axial line of the shaft 221, the same effects as mentioned above may be provided.

Figure 10:
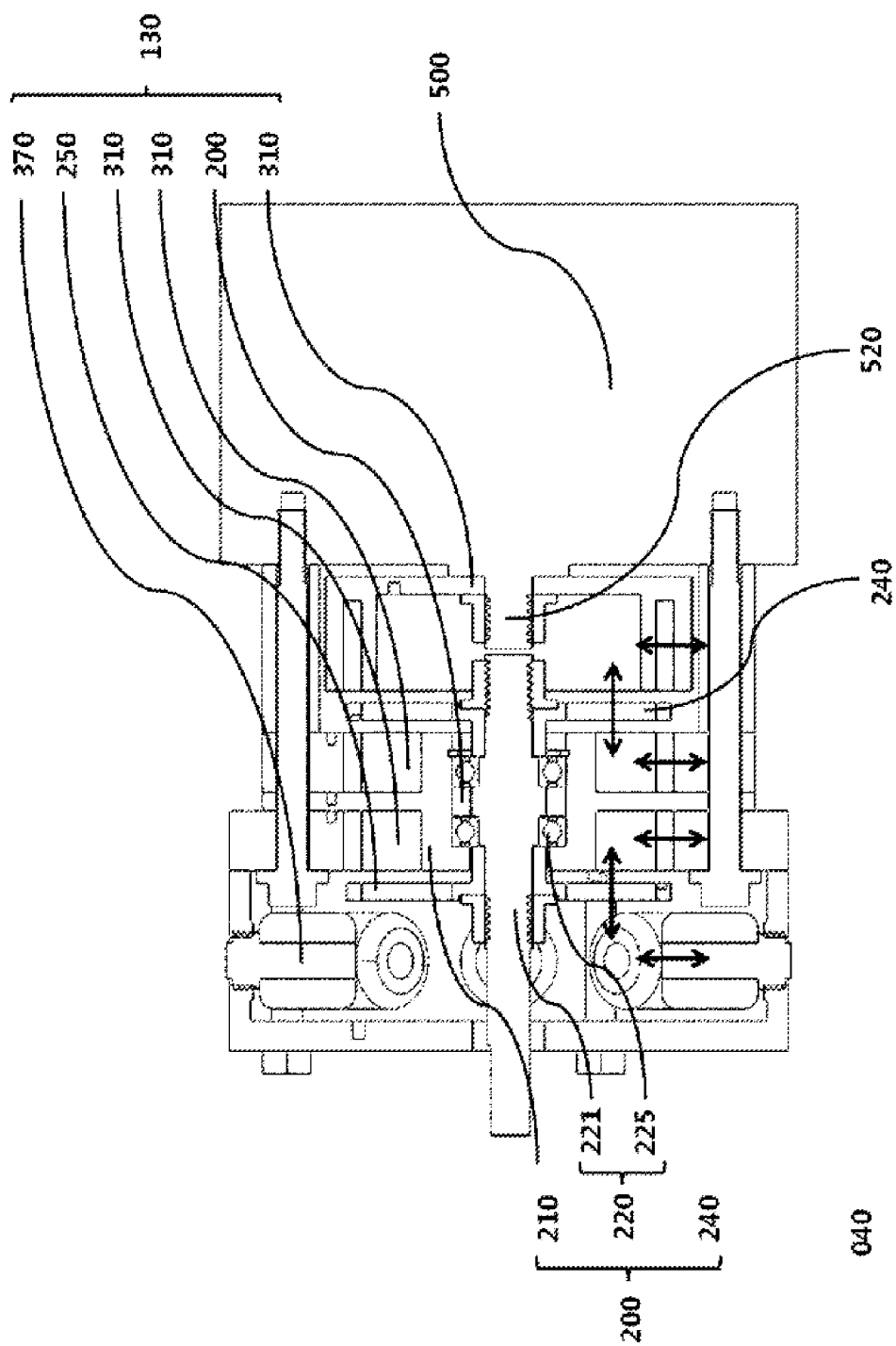
FIG. 10 is a sectional perspective view showing a high-speed motor according to a fourth embodiment of the present invention.

Now, an explanation on a fourth embodiment of the present invention will be given. FIG. 10 is a sectional perspective view showing a high-speed motor 040 according to the fourth embodiment of the present invention, and FIGS. 5 to 7 show the operations of a power transmission device 130. First, the parts of the high-speed motor 040 will be explained. The high-speed motor 040 according to the fourth embodiment of the present invention includes the electric motor 500 and the power transmission device 130 disposed at the front side of the electric motor 500 to increase a rotational driving force.

The power transmission device 130 adds a rear rotor 250 having permanent magnets 246 having the same directions of magnetic fluxes as those of the front rotor 240 and an armature module 370 having armatures 376 as bunches of coils adapted to produce magnetic fluxes with the driver module 310 to the power transmission device 110 according to the first embodiment of the present invention or to the power transmission device 120 according to the second embodiment of the present invention. The rear rotor 250 is spaced apart from the rear surface of the frame 210 by a given distance in the direction of the axial line of the frame 210 in such a manner as to be disposed in a right angle direction and fitted to the shaft 221, the permanent magnets 246 of the rear rotor 250 being arranged in the radial direction with respect to the axial line thereof, while having a given distance in the direction of the axial line of the shaft 221, in such a manner as to be disposed in the right angle direction to allow magnetic fluxes to be produced in the direction of the axial line of the shaft 221, and the driver module 310 and the armature module 370 are spaced apart from each other by a given distance in front of the rear rotor 250 and behind the rear rotor 250 in the direction of the axial line of the rear rotor 250 in such a manner as to be disposed in a right angle direction and mounted on the rear surface of the frame 210, the permanent magnets 316 of the driver module 310 and the armatures 376 of the armature module 370 being arranged to allow magnetic fluxes to be produced in the radial direction with respect to the axial line of the shaft 221.

That is, the power transmission device 130 is configured to add the rear rotor 250 and the driver module 310 and the armature module 370 disposed in front of the rear rotor 250 and behind the rear rotor 250 to the power transmission device 110 according to the first embodiment of the present invention or to the power transmission device 120 according to the second embodiment of the present invention.

As shown in FIG. 3, the rear rotor 250 includes the rotary plate 242 having the 2n (hereinafter, n is an integer) permanent magnet insertion holes 245 formed equally spaced apart from each other with respect to the reference point 241 on the circumferential axis of the disc-shaped body having the shaft through hole formed at the center thereof and the 2n permanent magnets 246 inserted into the permanent magnet insertion holes 245 with respect to the reference point 241 of the rotary plate 242 in such a manner where the N and S poles are inserted alternately thereinto and magnetic fluxes are produced in the direction of the axial line of the shaft 221.

Figure 11:
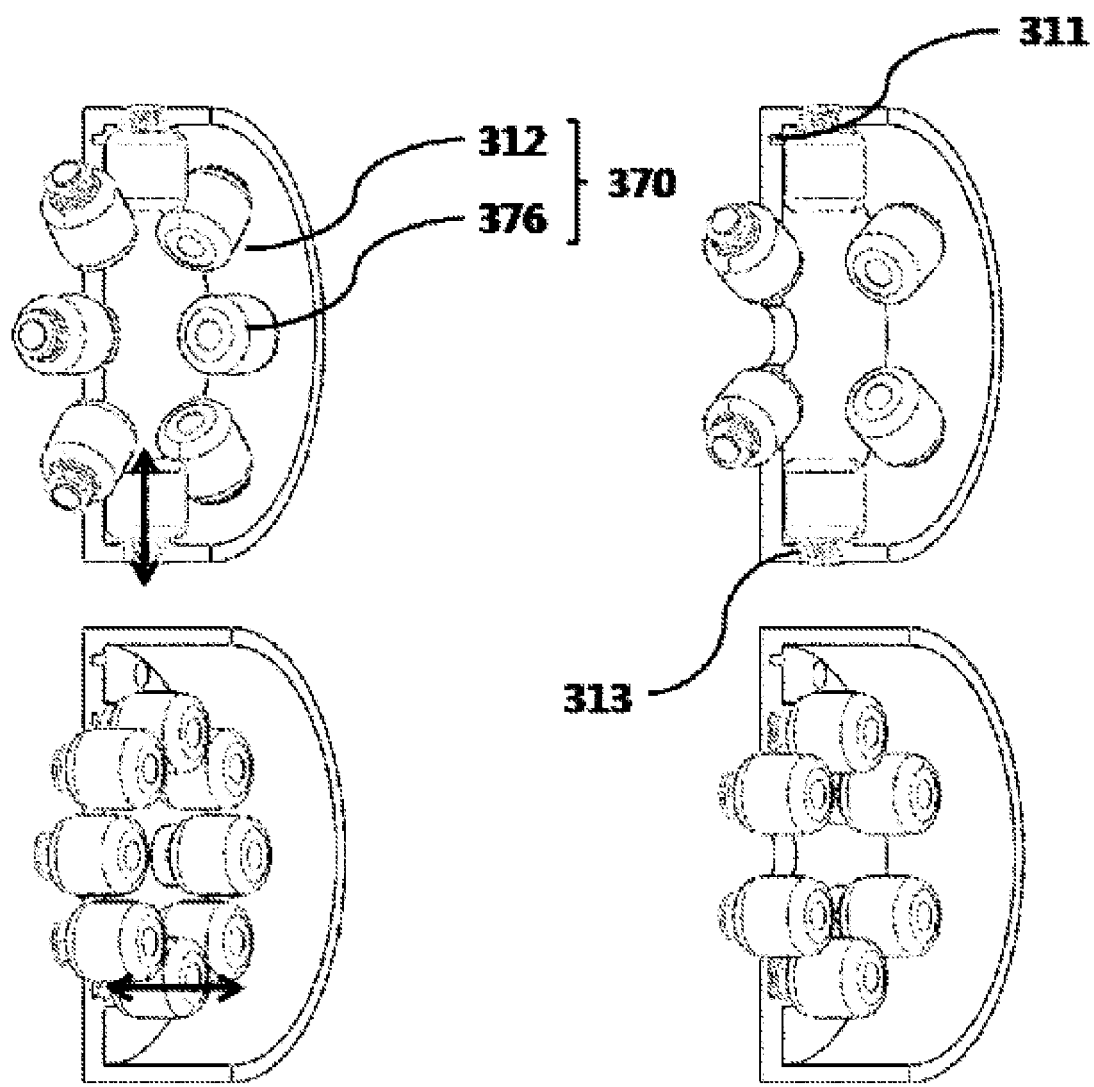
FIG. 11 is a sectional perspective view showing an armature module in the high-speed motor according to the fourth embodiment of the present invention.

Further, as shown in FIG. 11, the armature module 370 includes a fixing stand 312 having a shaft through hole formed on a center of a cylindrical or disc-shaped body whose one side surface is closed and armature insertion holes 313 formed equally spaced apart from each other with respect to a reference point 311 on the circumferential axial line of the body in the direction of the axial line with respect to the circumference thereof and in the radial direction with respect to the circumference thereof around the rear rotor 250, and the armatures 376 inserted into the armature insertion holes 313 with respect to the reference point 311 of the fixing stand 312 in such a manner where N and S poles are inserted alternately thereinto or they are inserted thereinto with three-phase arrangements.

In detail, the armature module 370 includes the fixing stand 312 having the shaft through hole formed on the center of the cylindrical or disc-shaped body whose one side surface is closed and the 2n or 3n (hereinafter, n is an integer greater than 2) armature insertion holes 313 formed equally spaced apart from each other with respect to the reference point 311 thereof in the direction of the axial line with respect to the circumference thereof and in the radial direction with respect to the circumference thereof around the rear rotor 250, and the 2n or 3n armatures 376 as bunches of coils inserted into the 2n or 3n armature insertion holes 313 with respect to the reference point 311 of the fixing stand 312 in such a manner where the N and S poles are inserted alternately thereinto or they are inserted thereinto with three-phase arrangements and magnetic fluxes are produced in the radial direction with respect to the axial line of the shaft 221.

On the other hand, the power transmission device 130 is desirably configured to allow the magnetic fluxes of the permanent magnets 246 of the front rotor 240 and the magnetic fluxes of the permanent magnets 246 of the rear rotor 250 to be produced in the radial direction with respect to the axial line of the shaft 221 and to allow the magnetic fluxes of the permanent magnets 316 of the driver modules 310 and the magnetic fluxes of the armatures 376 of the armature module 370 to be produced in the direction of the axial line of the shaft 221.

Next, an explanation on the operation of the high-speed motor 040 will be given. In addition to the power transmission device 110 according to the first embodiment of the present invention or in the power transmission device 120 according to the second embodiment of the present invention, the power transmission device 130 is configured to have the rear rotor 250 spaced apart from the rear surface of the frame 210 by the given distance in the direction of the axial line of the frame 210 in such a manner as to be disposed in a right angle direction and fitted to the shaft 221 to allow the magnetic fluxes of the permanent magnets 246 of the rear rotor 250 to be produced in the direction of the axial line of the shaft 221, and to have the driver module 310 and the armature module 370 spaced apart from each other by the given distance in front of the rear rotor 250 and behind the rear rotor 250 in the direction of the axial line of the shaft 221 in such a manner as to be disposed in a right angle direction and mounted on the rear surface of the frame 210 to allow the permanent magnets 316 and the armatures 376 to be arranged in the radial direction with respect to the axial line of the shaft 221 around the rear rotor 250 and to also allow the magnetic fluxes of the permanent magnets 316 and the armatures 376 to be produced in the radial direction with respect to the axial line of the shaft 221, so that the power transmission device 130 receives the rotational power of the electric motor 500 and external power. A space ensuring adapter may be mounted between the rotor module 200 and the electric motor 500.

The rear rotor 250 fitted to the same shaft 221 as the front rotor 240 is driven through the interaction of attraction and repulsion with the driver module 310 and the armature module 370, in the same manner as the front rotor 240 as shown in FIG. 7 driven through the interaction with the driver modules 310.

Under the above-mentioned configuration of the high-speed motor 040, in the same manner as the first embodiment of the present invention, the high-speed motor 040 operates with the rotational power supplied from the electric motor 500 and the external power, and thus, the induced magnetic field produced by the rotation of the front side driver module 310 fitted to the shaft 520 of the electric motor 500, the rotating magnetic fields produced by the front rotor 240 and the rear rotor 250, and the magnetic field of the driver module 310 fitted to the frame 210 and the magnetic field of the armature module 370 are perpendicular to each other to generate a rotational force through the interaction of the attraction and repulsion therebetween, thereby enhancing the number of rotations and the rotational force thereof to provide high output and power.

On the other hand, even though the power transmission device 130 is configured to allow the magnetic fluxes of the permanent magnets 246 of the front rotor 240 and the magnetic fluxes of the permanent magnets 246 of the rear rotor 250 to be produced in the radial direction with respect to the axial line of the shaft 221 and to allow the magnetic fluxes of the permanent magnets 316 of the driver modules 310 and the magnetic fluxes of the armatures 376 of the armature module 370 to be produced in the direction of the axial line of the shaft 221, the same effects as mentioned above may be provided.

The rotational force of the power transmission device 130 is determined by adjusting magnetic densities of the permanent magnets, contact areas of the magnetic fields, gaps of the permanent magnets facing in right angle directions to each other in such a manner as to have given gaps with the mounting diameter pitches of the permanent magnets, and current amounts of the armatures.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

The present invention relates to the high-speed motor with the power transmission device capable of enhancing the number of rotations and the rotational force to provide high output and power, so that it is applicable to various industrial, commercial, vehicle, and household fields.

The invention claimed is:

1. A high-speed motor comprising an electric motor and a power transmission device disposed at a front side of the electric motor to increase a rotational driving force, the power transmission device comprising:
   a rotor module, including:
      a shaft;
      a frame; and
      a front rotor spaced apart from a front surface of the frame in a direction of an axial line of the shaft and disposed perpendicular to the axial line of the shaft and fitted to the shaft, the front rotor having permanent magnets spaced apart from each other by a given distance and arranged along along a circumferential direction of the front rotor, magnetic fluxes of the permanent magnets of the front rotor being to be produced in the direction of the axial line of the shaft, and
   a first driver module spaced apart from the front rotor in the direction of the axial line of the shaft and disposed on the front side of the frame and disposed perpendicular to the axial line of the shaft, the first driver module having permanent magnets arranged along a circumferential direction of the first driver module, magnetic fluxes of the permanent magnets of the first driver module being in a radial direction with respect to the axial line of the shaft,
   wherein a front portion of the frame is mounted on the electric motor, the first driver module is fitted to a shaft of the electric motor to receive rotational power from the electric motor, and
   the front rotor of the rotor module faces the first driver module so that through an interaction of attraction and repulsion between a rotating magnetic field produced by rotation of the first driver module fitted to the shaft of the electric motor and a rotating magnetic field produced by the front rotor, a rotational force is generated to the rotor module.

2. The high-speed motor according to claim 1, wherein the rotor module comprises:

the frame having a cylindrical body and having a bearing mounting space and a bearing cooling space formed on an inner peripheral surface thereof around an axis of the cylindrical body and having mounting surfaces formed on front and rear surfaces of the cylindrical body to mount the first driver module and the electric motor thereon, a bearing module for fitting bearings to the shaft of the rotor module in such a manner as to be supported against the frame, and the front rotor including:

a rotary plate having a disc-shaped body and including 2n (hereinafter, n is an integer) permanent magnet insertion holes formed equally spaced apart from each other with respect to a reference point along a circumferential direction of the disc-shaped body and a shaft through hole formed at a center of the disc-shaped body; and 2n permanent magnets inserted into the 2n permanent magnet insertion holes, wherein N and S poles are inserted alternately into the 2n permanent magnet insertion holes.

3. The high-speed motor according to claim 1, wherein the first driver module comprises:

a fixing stand having a cylindrical or disc-shaped body whose one side surface is closed and including a shaft through hole formed on a center of the cylindrical or disc-shaped body and 2n or 3n (hereinafter, n is an integer greater than 2) permanent magnet insertion holes formed equally spaced apart from each other and disposed along a circumferential direction of the cylindrical or disc-shaped body, and 2n or 3n permanent magnets inserted into the 2n or 3n permanent magnet insertion holes, wherein N and S poles are inserted into the 2n or 3n permanent magnet insertion holes alternately or with three-phase arrangements.

4. The high-speed motor according to claim 1, wherein the power transmission device further comprises:

a second driver module spaced apart from the front rotor in the direction of the axial line of the shaft of the rotor module, and disposed on a rear side of the front rotor, the second driver module being disposed perpendicular to the axial line of the shaft of the rotor module and mounted onto the front surface of the frame, and wherein the front rotor of the rotor module faces the first and second driver modules and wherein magnetic fluxes of the permanent magnets of the first and second driver modules are disposed on front and rear sides of the front rotor, respectively, and wherein, through an interaction of attraction and repulsion among a rotating magnetic field produced by rotation of the first driver module, a rotating magnetic field produced by the front rotor, and a magnetic field of the second driver module, a rotational force is generated to the rotor module.

5. The high-speed motor according to claim 4, wherein the power transmission device further comprises:

a rear rotor having permanent magnets that generate magnetic fluxes in same directions as magnetic fluxes generated by the front rotor, a third driver module and an armature module having armatures that include 2n or 3n (hereinafter, n is an integer greater than 2) bunches of coils adapted to produce magnetic fluxes, the rear rotor being spaced apart from a rear surface of the frame in the direction of the axial line of the shaft of the rotor module and disposed perpendicular to the axial line of the shaft of the rotor module and fitted to the shaft of the rotor module, wherein the permanent magnets of the rear rotor are arranged along a circumferential direction of the rear rotor, wherein the third driver module and the armature module are spaced apart from each other in the direction of the axial line of the shaft of the rotor module and respectively disposed on front and rear sides of the rear rotor and mounted on a rear surface of the frame to receive the rotational power from the electric motor and external power, wherein the permanent magnets of the third driver module and the armatures are arranged to allow magnetic fluxes to be produced in a radial direction with respect to the axial line of the shaft of the rotor module, and wherein the front rotor of the rotor module faces the first and second driver modules and the rear rotor faces the third driver module and the armature module so that through an interaction of attraction and repulsion among a rotating magnetic field produced by rotation of the first driver module, rotating magnetic fields produced by the front rotor and the rear rotor, and magnetic fields of the second and third driver modules and the armature module, a rotational force is generated to increase the rotor module.

6. The high-speed motor according to claim 5, wherein the armature module comprises:

a fixing stand having a cylindrical or disc-shaped body whose one side surface is closed and including a shaft through hole formed on a center of the cylindrical or disc-shaped body and 2n or 3n armature insertion holes formed equally spaced apart from each other and disposed along a circumferential direction of the cylindrical or disc-shaped body, and wherein the 2n or 3n bunches of coils are inserted into the 2n or 3n armature insertion holes, and wherein N and S poles are insertedly alternately bonded thereto or insertedly bonded thereto with three-phase arrangements and magnetic fluxes are produced in a radial direction with respect to the axial line of the shaft of the rotor module.

7. The high-speed motor according to claim 5, wherein the power transmission device is configured to allow magnetic fluxes of the permanent magnets of the front rotor and the rear rotor of the rotor module to be produced in a radial direction with respect to the axial line of the shaft of the rotor module and to allow magnetic fluxes of the permanent magnets of the driver modules and the armatures of the armature module to be produced in the direction of the axial line of the shaft of the rotor module.

8. The high-speed motor according to claim 4, wherein the power transmission device further comprises:

a rear rotor having permanent magnets that generate magnetic fluxes in same directions as magnetic fluxes generated by the front rotor; and driver modules, wherein the rear rotor is spaced apart from the rear surface of the frame in the direction of the axial line of the shaft of the rotor module and disposed perpendicular to the axial line of the shaft of the rotor module and fitted to the shaft of the rotor module, wherein the permanent magnets of the rear rotor are arranged along a circumferential direction of the rear rotor and generates magnetic fluxes in the direction of the axial line of the shaft, wherein the driver modules are spaced apart from each other and respectively disposed on front and rear sides of the rear rotor and mounted on the rear surface of the frame to receive rotational power from the electric motor, wherein the permanent magnets of the driver modules are arranged in the direction of the axial line with respect to the circumference thereof around the rear rotor along a circumferential direction of the rear rotor to allow magnetic fluxes to be produced in a radial direction with respect to the axial line of the shaft of the rotor module, and wherein the front rotor and the rear rotor face the driver modules so that through an interaction of attraction and repulsion among a rotating magnetic field produced by rotation of the first driver module, rotating magnetic fields produced by the front rotor and the rear rotor, and magnetic fields of the driver modules mounted on the frame, a rotational force is generated to the rotor module.

9. The high-speed motor according to claim 1, wherein the power transmission device further comprises:

a rear rotor having permanent magnets that generate magnetic fluxes in same directions as magnetic fluxes generated by the front rotor; and driver modules, wherein the rear rotor are spaced apart from a rear surface of the frame in the direction of the axial line of the shaft of the rotor module and disposed perpendicular to the axial line of the shaft of the rotor module and fitted to the shaft of the rotor module, wherein the permanent magnets of the rear rotor are arranged along a circumferential direction of the rear rotor, wherein the driver modules are spaced apart from each other in a direction of an axial line of the rear rotor and respectively disposed on front and rear sides of the rear rotor and mounted on the rear surface of the frame to receive the rotational power from the electric motor, wherein the permanent magnets of the driver modules are arranged along a circumferential direction of the rear rotor to allow magnetic fluxes to be produced in a radial direction with respect to the axial line of the shaft of the rotor module, and wherein the front rotor and the rear rotor of the rotor module face the driver modules so that through an interaction of attraction and repulsion among a rotating magnetic field produced by rotation of the first driver module, rotating magnetic fields produced by the front rotor and the rear rotor, and magnetic fields of the driver modules mounted on the frame, a rotational force is generated to the rotor module.

10. The high-speed motor according to claim 9, wherein the rear rotor comprises:

a rotary plate having a disc-shaped body and including 2n (hereinafter, n is an integer) permanent magnet insertion holes formed equally spaced apart from each other with respect to a reference point along a circumferential direction of the disc-shaped body and a shaft through hole formed at the center of the rotary plate; and 2n permanent magnets inserted into the 2n permanent magnet insertion holes, wherein N and S poles are inserted alternately into the 2n permanent magnet insertion holes and magnetic fluxes are produced in the direction of the axial line of the shaft of the rotor module.

11. The high-speed motor according to claim 9, wherein the power transmission device is configured to allow magnetic fluxes of the permanent magnets of the front rotor and the rear rotor to be produced in a radial direction with respect to the axial line of the shaft of the rotor module and to allow magnetic fluxes of the permanent magnets of the driver modules to be produced in the direction of the axial line of the shaft of the rotor module.

* * * * *